(12) United States Patent
Sagasaki et al.

(10) Patent No.: US 12,287,622 B2
(45) Date of Patent: Apr. 29, 2025

(54) NUMERICAL CONTROL DEVICE AND NUMERICAL CONTROL METHOD

(71) Applicant: Mitsubishi Electric Corporation, Tokyo (JP)

(72) Inventors: Masakazu Sagasaki, Tokyo (JP); Kensuke Baba, Tokyo (JP); Takashi Sueda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 813 days.

(21) Appl. No.: 17/417,766

(22) PCT Filed: Jan. 9, 2019

(86) PCT No.: PCT/JP2019/000389
§ 371 (c)(1),
(2) Date: Jun. 24, 2021

(87) PCT Pub. No.: WO2020/144772
PCT Pub. Date: Jul. 16, 2020

(65) Prior Publication Data
US 2022/0011754 A1    Jan. 13, 2022

(51) Int. Cl.
*G05B 19/418*    (2006.01)

(52) U.S. Cl.
CPC . *G05B 19/41825* (2013.01); *G05B 19/41835* (2013.01)

(58) Field of Classification Search
None
See application file for complete search history.

(56) References Cited

U.S. PATENT DOCUMENTS

| | | | |
|---|---|---|---|
| 2004/0005372 A1* | 1/2004 | Shirahata | B25J 9/1676 425/165 |
| 2008/0188985 A1* | 8/2008 | Sakano | B25J 9/1648 901/32 |

(Continued)

FOREIGN PATENT DOCUMENTS

| | | |
|---|---|---|
| JP | 3199724 B2 | 8/2001 |
| JP | 2002-236668 A | 8/2002 |

(Continued)

OTHER PUBLICATIONS

International Search Report and Written Opinion mailed on Mar. 19, 2019, received for PCT Application PCT/JP2019/000389, Filed on Jan. 9, 2019, 11 pages including English Translation.

(Continued)

*Primary Examiner* — Howard Cortes
(74) *Attorney, Agent, or Firm* — XSENSUS LLP

(57) ABSTRACT

A numerical control device includes a control computation unit that controls a machine tool and a robot by using an NC program defined in a first coordinate system, the control computation unit includes a storage unit that stores the NC program including a first command, which is a command for the machine tool described in a first programming language, and a second command, which is a command for the robot described in the first programming language, and a program converting unit that converts the second command into a third command, which is a robot program used for controlling the robot, and the control computation unit controls the machine tool by using the first command and controls the robot by using the third command.

16 Claims, 21 Drawing Sheets

(56) References Cited

U.S. PATENT DOCUMENTS

| | | | | |
|---|---|---|---|---|
| 2013/0166068 | A1* | 6/2013 | Yanagita | G05B 19/4083 |
| | | | | 700/245 |
| 2017/0123820 | A1* | 5/2017 | Nishi | G06T 7/0002 |
| 2017/0220017 | A1 | 8/2017 | Nishi et al. | |
| 2018/0050418 | A1* | 2/2018 | Dong | B23K 20/123 |
| 2018/0264651 | A1* | 9/2018 | Ojima | B25J 9/1602 |
| 2018/0281173 | A1* | 10/2018 | Hane | B25J 9/161 |
| 2018/0333846 | A1* | 11/2018 | Tarui | B25J 11/005 |
| 2019/0101904 | A1* | 4/2019 | Shimamura | G05B 19/41825 |
| 2020/0364173 | A1* | 11/2020 | Kuzmin | G06F 13/4282 |

FOREIGN PATENT DOCUMENTS

| | | |
|---|---|---|
| JP | 2009-279608 A | 12/2009 |
| JP | 2011-48467 A | 3/2011 |
| JP | 2012-240142 A | 12/2012 |
| JP | 2013-134786 A | 7/2013 |
| JP | 2014-018939 A | 2/2014 |
| JP | 2017-134722 A | 8/2017 |

OTHER PUBLICATIONS

Written Opposition issued on Aug. 11, 2020, received for JP Application No. 2019-554952, 103 pages with Partial English translation and Explanation of the written opposition.

Office Action issued on Oct. 6, 2021, in corresponding Japanese patent Application No. 2019-554952, 28 pages.

Siemens, "Application example for connection of a KUKA robot with KR C4 to a Sinumerik 840D sl with NCU 7x0.3 Sinumeric Integrate Run MyRobot /Machining V2.0", Item-ID: 109478857, Application description, Sep. 2015, total 102 pages. https://support.industry.siemens.com/cs/ww/en/view/109478857.

German Office Action issued Mar. 3, 2022, in corresponding German Patent Application 11 2019 006 613.7, 19 pp.

Weck, M.; Brecher, Ch.: Werkzeugmaschinen. Bd. 4. Automatisierung von Maschinen und Anlagen. 6., neu bearb. Aufl.. Berlin [u. a.] : Springer, 2006. S. 158-160, 273-275, 356-378.—ISBN 978-3-540-22507-2 with a partial English machine translation thereof.

\* cited by examiner

FIG.3

| G CODE | FUNCTION |
|---|---|
| G198 | ROBOT COMMAND ON |
| G199 | ROBOT COMMAND OFF |
| G200 | ROBOT JOINT INTERPOLATION |
| G200.5 | CONTINUOUS OPERATION SPECIFICATION |
| G201 | ROBOT LINEAR INTERPOLATION |
| G202 | ROBOT CIRCULAR INTERPOLATION |
| G243.1 | DIRECTION ANGLE CONTROL PARAMETER SETTING |
| G290 | ROBOT ABSOLUTE COMMAND |
| G291 | ROBOT INCREMENTAL COMMAND |
| G292 | ROBOT COORDINATE SYSTEM SETTING |

FIG.4

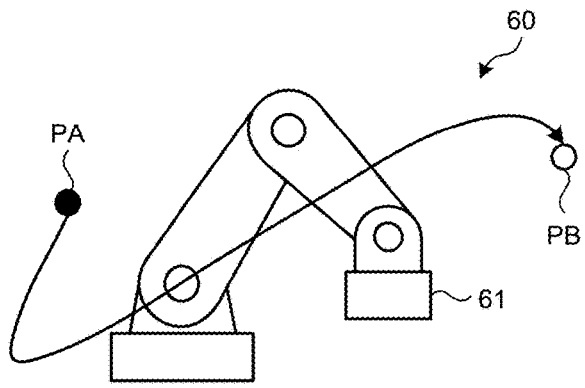

FIG.5

| ROBOT JOINT INTERPOLATION COMMAND |
|---|
| G200 RX_ RY_ RZ_ RA_ RB_ RC_ RS_ RT_ R_  (COORDINATE COMMAND SYSTEM) |
| G200 A1=_ A2=_ A3=_ A4=_ A5=_ A6=_ R_<br>(SHAFT MOVEMENT AMOUNT COMMAND SYSTEM) |
| G200 P_ R_  (TAUGHT POSITION COMMAND SYSTEM) |

FIG.6

| ADDRESS | MEANING OF ADDRESS | EXPLANATION |
|---|---|---|
| RX_ TO RZ_ | ROBOT CARTESIAN COORDINATE COMMAND | - |
| RA_ TO RC_ | ROBOT ROTATING COORDINATE COMMAND | - |
| RS_ | ROBOT POSTURE DATA (1) | - |
| RT_ | ROBOT POSTURE DATA (2) | - |
| R_ | CONTINUOUS OPERATION MODE | ASSUMED TO BE "0" WHEN OMITTED<br>0: CONTINUOUS OPERATION ENABLED<br>1: CONTINUOUS OPERATION DISABLED |
| Ax=_ | SHAFT MOVEMENT AMOUNT | UNIT BEING ANGLE REGARDLESS OF ROBOT SETTINGS (x = 1 TO 6: ROBOT SHAFT NAME) |
| P_ | TAUGHT POSITION | |

FIG.7

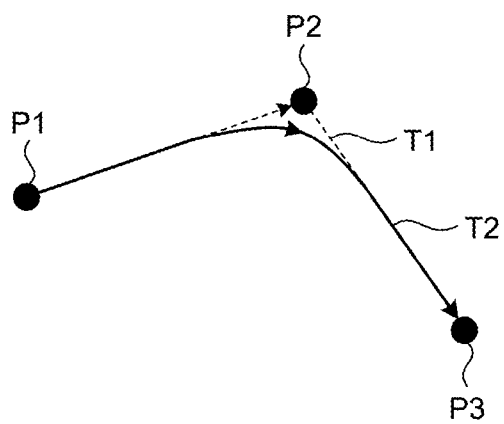

| ROBOT LINEAR INTERPOLATION COMMAND |
|---|
| G201 RX_ RY_ RZ_ RA_ RB_ RC_ RS_ RT_ R_ (COORDINATE COMMAND SYSTEM) |
| G201 P_ R_ (TAUGHT POSITION COMMAND SYSTEM) |

| ROBOT CIRCULAR INTERPOLATION COMMAND |
|---|
| G202 RX_ RY_ RZ_ RA_ RB_ RC_ RS_ RT_ HX_ HY_ HZ_ HA_ HB_ HC_ HS_ HT_ R_ W_ (COORDINATE COMMAND SYSTEM) |
| G202 P_ HP_ R_ (TAUGHT POSITION COMMAND SYSTEM) |

FIG.14

| NC SHAFT | ROBOT SHAFT |
|---|---|
| RX | X |
| RY | Y |
| RZ | Z |
| RA | A |
| RB | B |
| RC | C |
| RS | S |
| RT | T |
| A1= | A1 |
| A2= | A2 |
| A3= | A3 |
| A4= | A4 |
| A5= | A5 |
| A6= | A6 |

| $1 (FIRST SYSTEM) NC PROGRAM | $2 (SECOND SYSTEM) ROBOT COMMANDS |
|---|---|
| | N500    G198;(ROBOT MODE ON) |
| | N510    G292: B1;(SET ROBOT COORDINATES) |
| | N520    G291 G201 RX-30.RF10.;(MOVE RAW WORKPIECE TO GRASPING POSITION) |
| N100    M31;(OPEN CHUCK) | N530    M60;(GRASP RAW WORKPIECE) |
| N110    !2L1 | N540    G201P1;(POSITION RAW WORKPIECE AT LOADING POSITION) |
| N120    !2L2;(WAIT FOR LOADING OF RAW WORKPIECE) | N550    !1L1(WAIT FOR CHUCK TO OPEN) |
| N130    M32;(CLOSE CHUCK) | N560    G201P2;(LOAD RAW WORKPIECE) |
| N140    !2L3; | N570    !1L2; |
| N150    !2L4;(WAIT FOR LOADING OF RAW WORKPIECE TO BE COMPLETED) | N580    !1L3;(WAIT FOR CHUCK TO CLOSE) |
| N160    M91;(CLOSE AUTOMATIC DOOR) | N590    M61;(OPEN HAND) |
| N170    G28 U0W0;(RETURN TO ORIGIN) | N600    G201P10;(RETRACT TO OUTSIDE OF MACHINE) |
| N180    G0X100.Y100.Z100. ;(POSITIONING) | N610    !1L4; |
| N190    S10000;(MAIN SHAFT ROTATING COMMAND) | |
| N200    G1X10.F100;(MACHINING COMMAND) :(MACHINING) | |
| N210    G0X100.Y100.Z100. ;(POSITIONING: COMPLETE MACHINING) | N620    !1L5;(WAIT FOR MACHINING TO BE COMPLETED) |
| N220    !2L5; | N630    !1L6;(WAIT FOR OPENING OF AUTOMATIC DOOR TO BE COMPLETED) |
| N230    M90;(OPEN AUTOMATIC DOOR) | N640    G201P1;(MOVE TO FRONT OF CHUCK) |
| N240    !2L6; | N650    M61;(OPEN HAND) |
| | N660    G201P2;(MOVE TO WORKPIECE GRASPING POSITION) |
| N250    !2L7;(WAIT FOR HAND TO BE CLOSED (WORKPIECE TO BE GRASPED)) | N670·   M60;(CLOSE HAND (GRASP WORKPIECE)) |
| N260    M31;(OPEN CHUCK (RELEASE WORKPIECE)) | N680    !1L7; |
| N270    !2L8; | N690    !1L8;(WAIT FOR CHUCK TO OPEN) |
| N280    T2020;(REPLACE TOOL) | N700·   RX10.;(RETRACT WORKPIECE TO ABOVE) |
| N290    !2L9(WAIT FOR WORKPIECE TO BE UNLOADED) | N710    G200 P3 RF100.;(MOVE TO FRONT OF AUTOMATIC DOOR) |
| N300    M91;(CLOSE AUTOMATIC DOOR) | N720    !1L9; |
| : | N730    G201P50;(MOVE TO WORKPIECE TEMPORARY PLACEMENT AREA) |
| : | N740    G201P20;(TEMPORARILY PLACE WORKPIECE IN TEMPORARY PLACEMENT AREA) |
| | N750    M61;(OPEN HAND) |
| | N760    G201P70;(TO TOOL REST) |
| | N770    M70;(GRASP DEBURRING TOOL) |
| | N780    G201P20;(TO WORKPIECE TEMPORARY PLACEMENT AREA) |
| | N790    G202P10HP30;(DEBURR WORKPIECE) |

NUMERICAL CONTROL DEVICE AND NUMERICAL CONTROL METHOD

CROSS-REFERENCE TO RELATED APPLICATION

The present application is based on PCT filing PCT/JP2019/000389, filed Jan. 9, 2019, the entire contents of which are incorporated herein by reference.

FIELD

The present invention relates to a numerical control device and a numerical control method for controlling a robot and a machine tool.

BACKGROUND

One example of numerical control devices is a control device that performs control of a machine tool for machining an object to be machined concurrently with control of a robot for conveying the object to be machined.

A control device described in Patent Literature 1 controls a machine tool and a robot concurrently by executing numerical control programs created in advance for controlling the machine tool and robot programs created in advance for controlling the robot.

CITATION LIST

Patent Literature

Patent Literature 1: Japanese Patent No. 3199724

SUMMARY

Technical Problem

With the technology of Patent Literature 1, different programming languages are used for the numerical control programs and the robot programs; therefore, the robot cannot be controlled using the numerical control programs. Thus, for controlling the robot, robot programs for controlling the robot need to be created in addition to the numerical control programs.

The present invention has been made in view of the above, and an object thereof is to provide a numerical control device capable of controlling a robot by using numerical control programs.

Solution to Problem

To solve the aforementioned problems and achieve the object, a numerical control device according to the present invention includes a control computation unit that controls a machine tool and a robot by using a numerical control program defined in a first coordinate system. The control computation unit includes a storage unit that stores the numerical control program including a first command, which is a command for the machine tool described in a first programming language, and a second command, which is a command for the robot described in the first programming language, and a conversion unit that converts the second command into a third command, which is a robot program used for controlling the robot. The control computation unit controls the machine tool by using the first command, and controls the robot by using the third command.

Advantageous Effects of Invention

A numerical control device according to the present invention produces an effect of enabling control of a robot by using numerical control programs.

BRIEF DESCRIPTION OF DRAWINGS

FIG. 3 is a table illustrating information on a list of commands in NC robot programs used by the numerical control device according to the first embodiment.

FIG. 4 is a diagram for explaining a robot joint interpolation command used by the numerical control device according to the first embodiment.

FIG. 5 is a table illustrating information on a list of robot joint interpolation commands to be used by the numerical control device according to the first embodiment.

FIG. 6 is a table illustrating information on a list of addresses of robot joint interpolation commands to be used by the numerical control device according to the first embodiment.

FIG. 7 is a diagram for explaining a continuous operation setting command used by the numerical control device according to the first embodiment.

FIG. 14 is a table illustrating the association between an NC coordinate system and a robot coordinate system used by the numerical control device according to the first embodiment.

FIG. 18 is a diagram illustrating an NC program used when the operation illustrated in FIG. 17 is performed.

DESCRIPTION OF EMBODIMENTS

A numerical control device and a numerical control method according to certain embodiments of the present invention will be described in detail below with reference to the drawings. Note that the present invention is not limited to the embodiments.

First Embodiment

Figure 1:
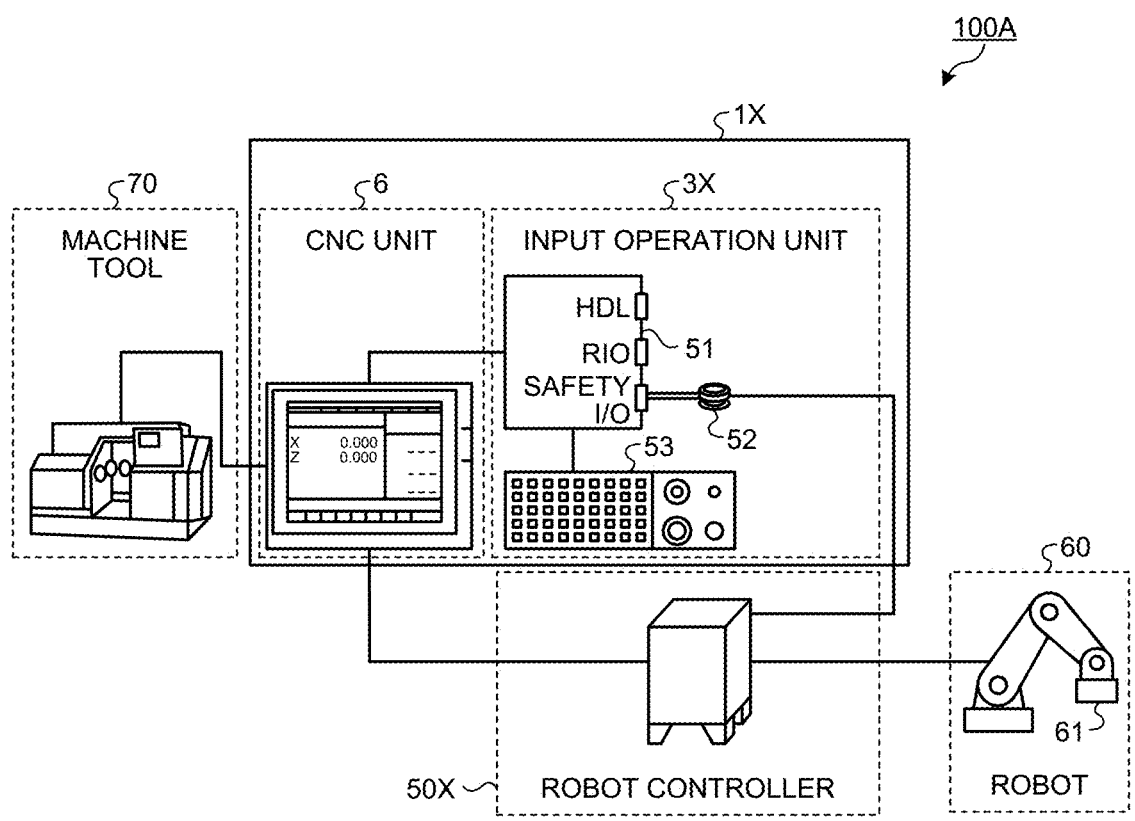
FIG. 1 is a diagram illustrating a configuration of a control system including a numerical control device according to a first embodiment.

FIG. 1 is a diagram illustrating a configuration of a control system including a numerical control device according to a first embodiment. A control system 100A is a system for controlling a machine tool 70 and a robot 60 by using numerical control (NC) programs.

The control system 100A includes the machine tool 70, a numerical control device 1X, a robot controller 50X, and the robot 60. The numerical control device 1X includes a computer numerical control (CNC) unit 6, and an input operation unit 3X.

The CNC unit 6 is connected to the machine tool 70, the input operation unit 3X, and the robot controller 50X. In addition, the robot controller 50X is connected to the input operation unit 3X and the robot 60. The CNC unit 6 and the robot controller 50X are connected via a local area network (LAN), for example.

In the control system 100A, the machine tool 70, the numerical control device 1X, and the robot controller 50X communicate with each other, and the robot controller 50X and the robot 60 communicate with each other. Thus, in the control system 100A, the numerical control device 1X and the robot 60 are connected to each other via the robot controller 50X, and the numerical control device 1X controls the robot 60 via the robot controller 50X. In the description below, the intervention of the robot controller 50X may be omitted in explanation of control on the robot 60 performed by the numerical control device 1X.

The numerical control device 1X is located on the machine tool 70. The numerical control device 1X is a computer that causes the machine tool 70 to machine a workpiece (object to be machined) by using a tool, and causes the robot 60 to convey a workpiece. The numerical control device 1X controls the machine tool 70 and the robot 60 by using NC programs such as G-code programs. An NC program includes a first command, which is a command for the machine tool 70 described in a first programming language, and a second command, which is a command for the robot 60 described in the first programming language. The numerical control device 1X converts the second command of the NC program into a third command, which is a command of a robot program described in a second programming language, and controls the robot 60 by using the third command.

The input operation unit 3X is a device with which a user operates the CNC unit 6 and the robot controller 50X. The input operation unit 3X includes an input/output unit 51, an emergency stop button 52, and a control panel 53. The input operation unit 3X operates the CNC unit 6 and the robot controller 50X by sending a signal associated with a user operation to the CNC unit 6 and the robot controller 50X.

The control panel 53 receives an operation of the user, and sends a signal associated with the operation to the input/output unit 51. The emergency stop button 52, when being pressed by the user, sends a signal for stopping the robot controller 50X to the robot controller 50X, and a signal for stopping the machine tool 70 to the input/output unit 51. The input/output unit 51 sends the signal from the control panel 53 and the signal from the emergency stop button 52 to the CNC unit 6. The emergency stop button 52 and the input/output unit 51 may be located on the control panel 53.

The robot controller 50X controls the robot 60 in accordance with the robot program sent from the numerical control device 1X. In addition, when the signal is sent from the emergency stop button 52, the robot controller 50X stops the robot 60.

The robot 60 grasps a workpiece, which is an object to be machined, with a robot hand 61, and conveys the grasped workpiece. The robot 60 loads the workpiece before machining on the machine tool 70, and unloads the workpiece after machining from the machine tool 70. Note that the robot 60 may perform processes other than conveyance of a workpiece.

The CNC unit 6 includes a control computation unit 2X and a display unit 4, which will be described later. The CNC unit 6 controls the machine tool 70 and the robot 60 by using NC programs. In addition, upon receiving a signal from the input operation unit 3X, the CNC unit 6 causes the machine tool 70 to perform a process associated with the received signal. The CNC unit 6 also displays the state of the machine tool 70, the state of the robot 60, and the like.

The machine tool 70 is an NC machine tool that machines the workpiece with a tool while moving the tool and the workpiece relative to each other by two or more drive shafts. A first coordinate system, which is a coordinate system of the machine tool 70, and a second coordinate system, which is a coordinate system of the robot 60, are different from each other. The machine tool 70 is controlled in a cartesian coordinate system, and moves the tool or the workpiece in three axial directions, for example. The robot 60 includes a rotating shaft, and is driven in four or more axial directions, for example. The robot 60 includes a plurality of joints and a plurality of arms, and one joint moves one arm in one or more axial directions.

Figure 2:
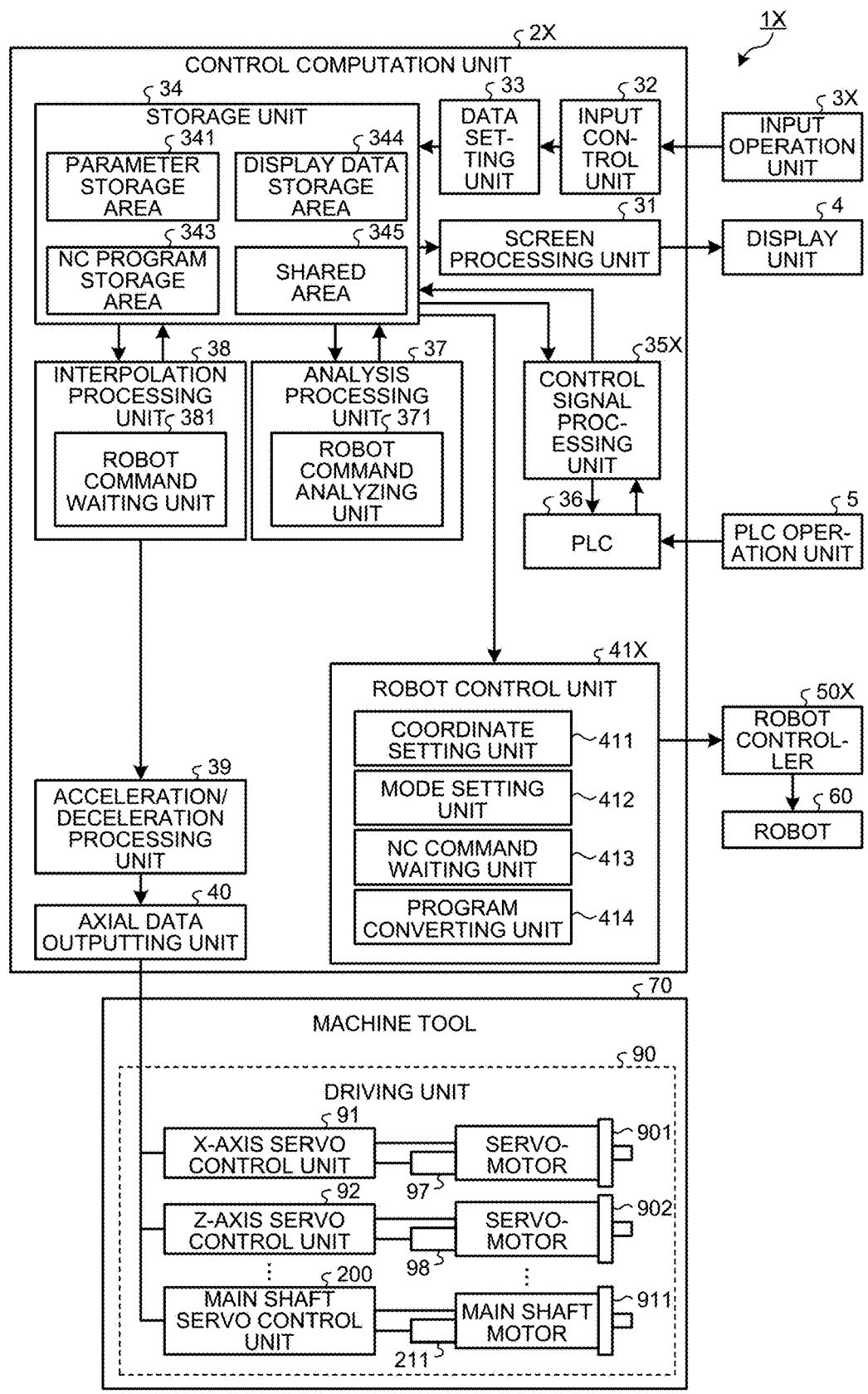
FIG. 2 is a diagram illustrating an example of a configuration of the numerical control device according to the first embodiment.

FIG. 2 is a diagram illustrating an example of a configuration of the numerical control device according to the first embodiment. The numerical control device 1X includes the control computation unit 2X, the input operation unit 3X, the display unit 4, and a programmable logic controller (PLC) operation unit 5 such as a machine control panel for operating a PLC 36. FIG. 2 illustrates, along with the numerical control device 1X, the machine tool 70, the robot controller 50X, and the robot 60.

The machine tool 70 includes a driving unit 90 that drives the tool and the workpiece. An example of the driving unit 90 is a driving mechanism that drives the tool while rotating the workpiece. In the first embodiment, the tool is driven in two directions, which are a direction parallel to the X-axis direction and a direction parallel to the Z-axis direction, for example. Note that the axial directions depend on the device configuration, and are therefore not limited to the aforementioned directions.

The driving unit 90 includes servomotors 901 and 902 for moving the tool in respective axial directions defined in the numerical control device 1X, and detectors 97 and 98 for detecting positions and velocities of the servomotors 901 and 902. The driving unit 90 also includes servo control units for the individual axial directions for controlling the servomotors 901 and 902 on the basis of commands from the numerical control device 1X. The servo control units for the individual axial directions perform feedback control on the servomotors 901 and 902 on the basis of the positions and the velocities from the detectors 97 and 98.

Among the servo control units, an X-axis servo control unit 91 controls the operation of the tool in the X-axis direction by controlling the servomotor 901, and a Z-axis servo control unit 92 controls the operation of the tool in the Z-axis direction by controlling the servomotor 902. Note that the machine tool 70 may include two or more tool rests. In this case, the driving unit 90 includes, for each tool rest, a set of the X-axis servo control unit 91, the Z-axis servo control unit 92, the servomotors 901 and 902, and the detectors 97 and 98.

The driving unit 90 also includes a main shaft motor 911 for rotating a main shaft for rotating the workpiece, and a detector 211 for detecting the position and the speed of the main shaft motor 911. The speed detected by the detector 211 corresponds to the speed of the main shaft motor 911.

The driving unit 90 also includes a main shaft servo control unit 200 for controlling the main shaft motor 911 on the basis of commands from the numerical control device 1X. The main shaft servo control unit 200 performs feedback control on the main shaft motor 911 on the basis of the position and the speed from the detector 211.

Note that, in a case where the machine tool 70 machines two workpieces at the same time, the driving unit 90 includes two sets of the main shaft motor 911, the detector 211, and the main shaft servo control unit 200. In this case, the machine tool 70 includes two or more tool rests.

The input operation unit 3X is means for inputting information to the control computation unit 2X. The input operation unit 3X is constituted by input means such as a keyboard, a button, or a mouse, to receive an input of a command or the like for the numerical control device 1X from a user, an NC program, a parameter, or the like, and inputs the received command, NC program, parameter, or the like to the control computation unit 2X. The display unit 4 is constituted by display means such as a liquid crystal display device, to display information processed by the control computation unit 2X on a display screen. An example of the display unit 4 is a liquid crystal touch panel. In this case, some functions of the input operation unit 3X are located in the display unit 4.

The control computation unit 2X, which is a control unit, controls the machine tool 70 and the robot 60 by using NC programs defined on the coordinate system of the machine tool 70. The control computation unit 2X includes an input control unit 32, a data setting unit 33, a storage unit 34, a screen processing unit 31, an analysis processing unit 37, a control signal processing unit 35X, the PLC 36, an interpolation processing unit 38, an acceleration/deceleration processing unit 39, an axial data outputting unit 40, and a robot control unit 41X. Note that the PLC 36 may be located outside the control computation unit 2X.

The storage unit 34 includes a parameter storage area 341, an NC program storage area 343, a display data storage area 344, and a shared area 345. The parameter storage area 341 stores parameters to be used for processing performed by the control computation unit 2X, or the like. Specifically, the parameter storage area 341 stores control parameters, servo parameters, and tool data for making the numerical control device 1X operate. The NC program storage area 343 stores NC programs to be used for machining of a workpiece. An NC program in the first embodiment includes movement commands, which are commands for moving the tool, and commands for controlling the robot 60.

The display data storage area 344 stores screen display data to be displayed by the display unit 4. The screen display data are data for displaying information on the display unit 4. The storage unit 34 also includes the shared area 345 for storing data to be temporarily used.

The screen processing unit 31 performs control to display the screen display data stored in the display data storage area 344 on the display unit 4. The input control unit 32 receives information input from the input operation unit 3X. The data setting unit 33 stores information received by the input control unit 32 into the storage unit 34. Thus, input information received by the input operation unit 3X is written into the storage unit 34 via the input control unit 32 and the data setting unit 33.

The control signal processing unit 35X is connected with the PLC 36, and receives signal information, for example, on a relay for making a machine of the machine tool 70 operate from the PLC 36. The control signal processing unit 35X writes the received signal information into the shared area 345 of the storage unit 34. The signal information is referred to by the interpolation processing unit 38 during machining operation. In addition, when an auxiliary command is output by the analysis processing unit 37 into the shared area 345, the control signal processing unit 35X reads out the auxiliary command from the shared area 345 and sends the read auxiliary command to the PLC 36. Auxiliary commands are commands other than commands for moving a drive shaft, which is a numerically-controlled shaft. Examples of the auxiliary commands include M codes and T codes.

The PLC 36 stores ladder programs describing machine operations to be performed by the PLC 36. Upon receiving a T code or an M code, which is an auxiliary command, the PLC 36 performs a process associated with the auxiliary command on the machine tool 70 in accordance with a ladder program. After performing the process associated with the auxiliary command, the PLC 36 sends a completion signal indicating that the machine control is completed to the control signal processing unit 35X so as to execute the next block of an NC program.

In the control computation unit 2X, the control signal processing unit 35X, the analysis processing unit 37, the interpolation processing unit 38, and the robot control unit 41X are connected with each other via the storage unit 34, to write and read information via the storage unit 34. In the description below, the intervention of the storage unit 34 may be omitted from explanation of writing and reading of information into and out of the control signal processing unit 35X, the analysis processing unit 37, the interpolation processing unit 38, and the robot control unit 41X.

An NC program is selected by a user by inputting an NC program number with the input operation unit 3X. The NC program number is written into the shared area 345 via the input control unit 32 and the data setting unit 33. Being triggered by a cycle start of the machine control panel or the like, upon reading the selected NC program number from the shared area 345, the analysis processing unit 37 reads the selected NC program from the NC program storage area 343 and performs an analysis process on each block (each line) of the NC program. The analysis processing unit 37 analyzes G codes (commands relating to shaft movements or the like), T codes (tool replacement commands, etc.), S codes (main shaft motor speed commands), and M codes (machine operation commands), for example.

When an M code or a T code is included in the analyzed line, the analysis processing unit 37 sends the analysis result to the PLC 36 via the shared area 345 and the control signal processing unit 35X. When an M code is included in the analyzed line, the analysis processing unit 37 sends the M code to the PLC 36 via the control signal processing unit 35X. The PLC 36 executes machine control associated with the M code. When the execution is completed, a result indicating completion of the M code is written into the storage unit 34 via the control signal processing unit 35X. The interpolation processing unit 38 refers to the execution result written in the storage unit 34.

When a G code for the machine tool 70 is included, the analysis processing unit 37 sends the analysis result to the interpolation processing unit 38 via the shared area 345. Specifically, the analysis processing unit 37 generates a movement condition associated with the G code, and sends the movement condition to the interpolation processing unit 38. In addition, the analysis processing unit 37 sends a main shaft speed specified by an S code to the interpolation processing unit 38. The main shaft speed is the number of rotations of the main shaft per unit time. The movement condition is a tool feed condition for moving the machining position, and is expressed by the velocities at which the tool rest is to be moved, the positions to which the tool rest is to be moved, and the like. For example, for tool feed of the tool, the tool is advanced in the X-axis direction (+X direction) and the Z-axis direction (+Z direction).

In addition, the analysis processing unit 37 includes a robot command analyzing unit 371. The robot command analyzing unit 371 is means for analyzing the operation of the connected robot 60. The robot command analyzing unit 371 analyzes a robot command included in the NC program, and sends the analysis result to the robot control unit 41X via the shared area 345. Details of robot commands will be described later.

An analysis result includes a robot coordinate system setting command, which is a command for setting a coordinate system of the robot 60, a robot mode command, which specifies whether to turn commands for the robot 60 on (enabled) or off (disabled), a robot operation command, which defines the operation of the robot 60, and the like.

The interpolation processing unit 38 generates data for controlling the machine tool 70 by using commands for the machine tool 70 in the analysis result of the analysis processing unit 37, and sends the data to the acceleration/deceleration processing unit 39. The interpolation processing unit 38 includes a robot command waiting unit 381, which is a first waiting unit. When performing a waiting process between the robot 60 and the machine tool 70, the robot command waiting unit 381 keeps commands for the machine tool 70 (operation commands, etc.) on standby until specific timing. The waiting process between the robot 60 and the machine tool 70 will be described later.

The robot control unit 41X includes a coordinate setting unit 411, a mode setting unit 412, an NC command waiting unit 413, which is a second waiting unit, and a program converting unit 414.

The coordinate setting unit 411 sets the coordinate system of the robot 60 to a base coordinate system (corresponding to a machine coordinate system of the machine tool 70) or a tool coordinate system (a coordinate system of the robot hand 61 of the robot 60) on the basis of the robot coordinate system setting command. After the coordinate setting unit 411 sets the coordinate system associated with the robot coordinate system setting command, the robot control unit 41X operates the robot 60 in the set coordinate system.

When performing a waiting process between the robot 60 and the machine tool 70, the NC command waiting unit 413 keeps commands for the robot 60 on standby until specific timing.

The program converting unit 414, which is a conversion unit, generates a robot program to be used for controlling the robot 60 by converting a command (a second command) defined in the coordinate system of the machine tool 70 into a command (a third command) defined in the coordinate system of the robot 60. The program converting unit 414 converts a program for the robot 60 in the NC programs into a robot program that can be interpreted by the robot controller 50X by using robot command list information 101, association information 102, joint interpolation information 103, address information 104, linear interpolation information 105, and circular interpolation information 106, which will be described later. In other words, the program converting unit 414 is a conversion unit that converts a command for the robot 60 generated in an NC program into a command in a robot program. Commands for the robot 60 among commands in NC programs are described using RX_, RY_, RZ_, and the like, which will be described later. The program converting unit 414 sends the robot program to the robot controller 50X.

The mode setting unit 412 receives a robot mode command, which is an analysis result, from the robot command analyzing unit 371. A robot mode command is a command specifying whether to turn on or off a command for the robot 60 from the numerical control device 1X. In the description below, a command specifying that a command for the robot 60 is to be turned on will be referred to as a robot mode ON command, and a command specifying that a command for the robot 60 is to be turned off will be referred to as a robot mode OFF command.

Upon receiving a robot mode ON command from the robot command analyzing unit 371, the mode setting unit 412 informs the program converting unit 414 that a command for the robot 60 will arrive thereafter. After the mode setting unit 412 receives the robot mode ON command, the robot control unit 41X receives commands for the robot 60 until a new robot mode OFF command is received.

When the mode setting unit 412 receives a robot mode OFF command from the robot command analyzing unit 371, the robot control unit 41X does not receive a command for the robot 60 until a new robot mode ON command is received. When a command for the robot 60 is sent to the robot control unit 41X while the robot control unit 41X is set such that it does not receive a command for the robot 60, the display unit 4 displays "program error" in accordance with an instruction from the control computation unit 2X. An example of the robot mode ON command is G198, which will be described later, and an example of the robot mode OFF command is G199, which will be described later.

Commands used in NC programs for the robot 60 (hereinafter referred to as NC robot programs) to be used by the numerical control device 1X will now be described. FIG. 3 is a table illustrating information on a list of commands in NC robot programs used by the numerical control device according to the first embodiment. FIG. 3 illustrates the robot command list information 101, which is the information on the list of commands used in NC robot programs. In the robot command list information 101, G codes, which are commands used in NC robot programs, are associated with functions. The robot command list information 101 may be stored in the storage unit 34, or may be stored in a storage area other than the storage unit 34 in the numerical control device 1X. Similarly, the association information 102, the joint interpolation information 103, the address information 104, the linear interpolation information 105, and the circular interpolation information 106 used by the program converting unit 414 may be stored in the storage unit 34 or may be stored in a storage area other than the storage unit 34 in the numerical control device 1X.

The function of G198 is a function of turning the robot mode on (robot command ON). The function of G199 is a function of turning the robot mode off (robot command OFF). Even during execution of the mode of G198, the numerical control device 1X can execute an NC command (a command for the machine tool 70). In addition, while a case where G198 is a modal command is described in the first embodiment, G198 may alternatively be a one-shot command described for each robot command. A modal command is a G code that holds the state with respect to a plurality of G codes, and a one-shot command is a G code applied to one block (one line) only.

The function of G200 is a function of causing the robot 60 to operate by joint interpolation (robot joint interpolation). Thus, G200 is a robot joint interpolation command for causing the robot 60 to operate by joint interpolation.

The function of G200.5 is a function of causing the robot 60 to continuously operate (continuous operation specification). Thus, G200.5 is a continuous operation setting command for causing the robot 60 to continuously operate.

The function of G201 is a function of moving the robot 60 by linear interpolation (robot linear interpolation). Thus, G201 is a robot linear interpolation command for moving the robot 60 by linear interpolation.

The function of G202 is a function of moving the robot 60 by circular interpolation (robot circular interpolation). Thus, G202 is a robot circular interpolation command for moving the robot 60 by circular interpolation.

The function of G243.1 is a command for setting a parameter for controlling a direction angle (direction angle control parameter setting). Thus, G243.1 is a command for controlling a direction angle.

The function of G290 is a function of causing the robot 60 to operate by an absolute command (robot absolute command), and the function of G291 is a function of causing the robot 60 to operate by an incremental command (robot incremental command). An absolute command is used in a case where a stop position with respect to the origin is given. Thus, an absolute command specifies a position from the origin. An incremental command is used in a case where the amount of movement to the next stop position from a current stop position is to be specified. Thus, an incremental command specifies an amount of movement. The function of G292 is a function of setting a coordinate system for the robot 60 (robot coordinate system setting).

FIG. 4 is a diagram for explaining a robot joint interpolation command used by the numerical control device according to the first embodiment. A robot joint interpolation command is a command for controlling the robot 60 so that the movement time of a shaft to be moved by the longest movement distance among shafts in operation is shortest. When the numerical control device 1X issues a command of robot joint interpolation to move the position of the robot hand 61 of the robot 60 from a start point PA to an end point PB, the robot controller 50X extracts a shaft to be moved by the longest movement distance from the start point PA to the end point PB among the shafts of the robot 60, and controls the robot 60 so that the movement time of the extracted shaft will be shortest.

The types of robot joint interpolation commands, which are commands for execution of robot joint interpolation will now be described. FIG. 5 is a table illustrating information on a list of robot joint interpolation commands to be used by the numerical control device according to the first embodiment. FIG. 6 is a table illustrating information on a list of addresses of robot joint interpolation commands to be used by the numerical control device according to the first embodiment. FIG. 5 illustrates the joint interpolation information 103, which is information on the list of robot joint interpolation commands, and FIG. 6 illustrates the address information 104, which is information on the list of addresses of robot joint interpolation commands.

As illustrated in FIG. 5, there are three types of command systems for robot joint interpolation commands. In the address information 104 illustrated in FIG. 6, an address of a robot joint interpolation command, the meaning of the address, and the explanation of the address are associated with each other.

A first command system of robot joint interpolation commands is a coordinate command system. In the description below, the coordinate command system of robot joint interpolation commands will be referred to as a coordinate command system CM1. The coordinate command system CM1 is a command system for controlling the position of the robot 60 to be a position specified in the robot coordinates. In the coordinate command system CM1, a command of robot joint interpolation is issued in a format of "G200 RX_ RY_ RZ_ RA_ RB_ RC_ RS_ RT_ R_". All of RX, RY, RZ, RA, RB, RC, RS, and RT are commands for the robot 60.

RX_, RY_, and RZ_ in the coordinate command system CM1 are robot cartesian coordinate commands, and RA_, RB_, and RC_ are robot rotating coordinate commands. The robot cartesian coordinate commands are command specifying coordinates (X coordinate, Y coordinate, Z coordinate) in the cartesian coordinate system (X axis, Y axis, Z axis) of the robot 60. The robot rotating coordinate commands are commands specifying coordinates (A coordinate, B coordinate, C coordinate) in a rotating coordinate system (A axis, B axis, C axis) of the robot 60. In other words, in the coordinate command system CM1, the address of a robot joint interpolation command is expressed by an X coordinate, a Y coordinate, a Z coordinate, an A coordinate, a B coordinate, and a C coordinate.

In addition, in the coordinate command system CM1, RS_ represents robot posture data (1), and RT_ represents robot posture data (2). The robot posture data (1) and the robot posture data (2) are data specifying the posture of the robot 60. Because the robot 60 has a plurality of joints, the robot 60 can take various postures even when one position is specified. The robot posture data (1) and the robot posture data (2) specify the posture to be taken by the robot 60.

In addition, in the coordinate command system CM1, R_ is a command specifying whether or not the operation mode is a continuous operation mode. R0 indicates that continuous operation is enabled, and R1 indicates that continuous operation is disabled. Note that, in a case where R_ is omitted in the coordinate command system CM1, R_ is assumed to be R0. As described above, a command in the coordinate command system CM1 is a command for controlling the position of the robot 60 to be a position specified in the robot coordinates so that the movement time of the shaft to be moved by the longest movement distance is shortest.

A second command system of robot joint interpolation commands is a shaft movement amount command system. In the description below, the shaft movement amount command system of robot joint interpolation commands will be referred to as a shaft movement amount command system AM1. The shaft movement amount command system AM1 of robot joint interpolation commands is a command system for controlling the position of the robot 60 to be a position specified by a joint shaft of the robot 60.

In the shaft movement amount command system AM1, a robot joint interpolation command is set in a format of "G200 A1=_ A2=_ A3=_ A4=_ A5=_ A6=R_". In a case where the shaft movement amount command system AM1 is an incremental command, Ax=_ represents a shaft movement amount of a joint shaft, which is a rotating shaft of the robot 60; in a case where the shaft movement amount command system AM1 is an absolute command, Ax=_ represents a shaft angle of a joint shaft, which is a rotating shaft of the robot 60. For example, when A1=60 in an absolute command, the joint shaft moves to a position at 60°. Here, x represents a shaft name of a joint shaft, and is any of 1 to 6. For example, A1=abc (a, b, and c are numbers) in the shaft movement amount command system AM1 is a command for moving a joint of the robot 60 to an angle abc. The unit of Ax=_, which is a shaft movement amount, is an angle regardless of the settings of the robot 60.

As described above, a command in the shaft movement amount command system AM1 is a command for controlling the position of the robot 60 to be a position specified by a joint shaft of the robot 60 so that the movement time of the shaft to be moved by the longest movement distance is shortest. R_ in the shaft movement amount command system AM1 is a command specifying whether or not the operation mode is a continuous operation mode, in a manner similar to R_ in the coordinate command system CM1.

A third command system of robot joint interpolation commands is a taught position command system. In the description below, the taught position command system of robot joint interpolation commands will be referred to as a taught position command system TM1. The taught position command system TM1 of robot joint interpolation commands is a command system for controlling the position of the robot 60 to be a position taught in advance.

In the taught position command system TM1, a command of robot joint interpolation is issued in a format of "G200 P_ R_". P_ in the taught position command system TM1 is a taught position, which indicates a position to which the robot 60 is to be moved. A taught position is a command position of the robot 60 stored in the numerical control device 1X. As described above, a command in the taught position command system TM1 is a command for controlling the position of the robot 60 to be a taught position so that the movement time of the shaft to be moved by the longest movement distance is shortest. R in the taught position command system TM1 is a command specifying whether or not the operation mode is a continuous operation mode, in a manner similar to R in the coordinate command system CM1.

FIG. 7 is a diagram for explaining a continuous operation setting command used by the numerical control device according to the first embodiment. A continuous operation setting command is a command for moving the position of the robot 60 from a start position P1 to a target position P3 without passing through a middle position P2. When the continuous operation setting command is set, that is, when continuous operation setting is enabled, the numerical control device 1X moves the robot 60 along a path T2 (a track illustrated by a solid line). In contrast, when the continuous operation setting command is not set, that is, when continuous operation setting is disabled, the numerical control device 1X moves the robot 60 along a path T1 (a track illustrated by a broken line). Thus, when the continuous operation setting is disabled, the numerical control device 1X moves the position of the robot 60 from the start position P1 to the target position P3 via the middle position P2.

Figures 8, 9:
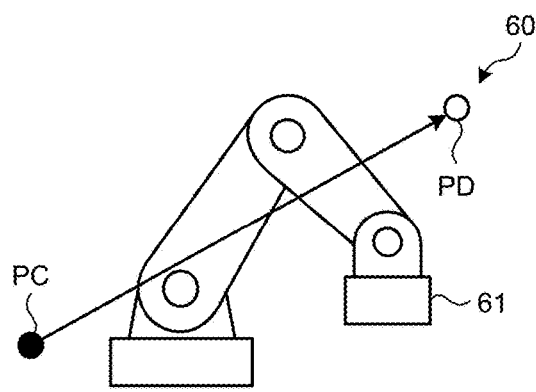
FIG. 8 is a diagram for explaining a robot linear interpolation command used by the numerical control device according to the first embodiment.
FIG. 9 is a table illustrating information on a list of robot linear interpolation commands to be used by the numerical control device according to the first embodiment.

Next, robot linear interpolation will be described with reference to FIGS. 8 and 9. FIG. 8 is a diagram for explaining a robot linear interpolation command used by the numerical control device according to the first embodiment. A robot linear interpolation command is a command for moving the position of the robot hand 61 of the robot 60 from a start point PC to an end point PD by linear interpolation.

The types of robot linear interpolation commands, which are commands for execution of robot linear interpolation will now be described. FIG. 9 is a table illustrating information on a list of robot linear interpolation commands to be used by the numerical control device according to the first embodiment. FIG. 9 illustrates the linear interpolation information 105, which is information on the list of robot linear interpolation commands. As illustrated in FIG. 9, there are two types of command systems for robot linear interpolation commands.

A first command system of robot linear interpolation commands is a coordinate command system. In the description below, the coordinate command system of robot linear interpolation commands will be referred to as a coordinate command system CM2. The coordinate command system CM2 is a command system for controlling the position of the robot 60 to be a position specified in the robot coordinates. In the coordinate command system CM2, a command of robot linear interpolation is issued in a format of "G201 RX_ RY_ RZ_ RA_ RB_ RC_ RS_ RT_ R_". The addresses and the meanings of RX_, RY_, RZ_, RA_, RB_, RC_, RS_, RT_, and R_ in the coordinate command system CM2 are the same as those of RX_, RY_, RZ_, RA_, RB_, RC_, RS_, RT_, and R_ in the coordinate command system CM1.

A second command system of robot linear interpolation commands is a taught position command system. In the description below, the taught position command system of robot linear interpolation commands will be referred to as a taught position command system TM2. In the taught position command system TM2, a command of a taught position is issued in a format of "G201 P_ R_". P_ and R_ in the taught position command system TM2 are the same as P_ and R_ in the taught position command system TM1.

Figures 10, 11:
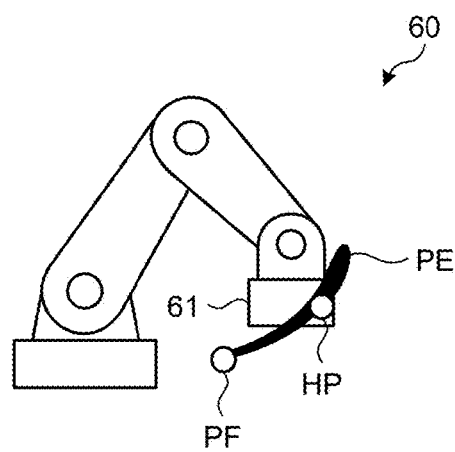
FIG. 10 is a diagram for explaining a robot circular interpolation command used by the numerical control device according to the first embodiment.
FIG. 11 is a table illustrating information on a list of robot circular interpolation commands to be used by the numerical control device according to the first embodiment.

Next, robot circular interpolation will be described with reference to FIGS. 10 and 11. FIG. 10 is a diagram for explaining a robot circular interpolation command used by the numerical control device according to the first embodiment. A robot circular interpolation command is a command for moving the position of the robot hand 61 of the robot 60 from a start point PE to an end point PF via an auxiliary point HP by circular interpolation.

The types of robot circular interpolation commands, which are commands for execution of robot circular interpolation will now be described. FIG. 11 is a table illustrating information on a list of robot circular interpolation commands to be used by the numerical control device according to the first embodiment. FIG. 11 illustrates the circular interpolation information 106, which is information on the list of robot circular interpolation commands.

As illustrated in FIG. 11, there are two types of command systems for robot circular interpolation commands. A first command system of robot circular interpolation commands is a coordinate command system. In the description below, the coordinate command system of robot circular interpolation commands will be referred to as a coordinate command system CM3. The coordinate command system CM3 is a command system for controlling the position of the robot 60 to be a position specified in the robot coordinates. In the coordinate command system CM3, a command of robot circular interpolation is issued in a format of "G202 RX_ RY_ RZ_ RA_ RB_ RC_ RS_ RT_ HX_ HY_ HZ_ HA_ HB_ HC_ HS_ HT_ R_ W_". The addresses and the meanings of RX_, RY_, RZ_, RA_, RB_, RC_, RS_, RT_, and R_ in the coordinate command system CM3 are the same as those of RX_, RY_, RZ_, RA_, RB_, RC_, RS_, RT_, and R_ in the coordinate command system CM1.

HX_ HY_ HZ_ HA_ HB_ HC_ HS_ HT_ in the coordinate command system CM3 represents values in the robot coordinate system at the auxiliary point HP. Specifically, HA_, HB_, and HC_ in the coordinate command system CM3 represent robot rotating coordinates of the A axis, the B axis, and the C axis, respectively, and HX_, HY_, and HZ_ in the coordinate command system CM3 represent robot cartesian coordinates of the X axis, the Y axis, and the Z axis, respectively.

In addition, in the coordinate command system CM3, HS_ represents robot posture data (1) at the auxiliary point HP, and HT_ represents robot posture data (2) at the auxiliary point HP. In addition, W_ in the coordinate command system CM3 represents an angle of movement by a circular interpolation command. When a command of W30 is issued, a base that supports the entire robot 60 moves by 30° along a circular arc path toward the end point PF via the auxiliary point HP.

A second command system of robot circular interpolation commands is a taught position command system. In the description below, the taught position command system of robot circular interpolation commands will be referred to as a taught position command system TM3. In the taught position command system TM3, a command of a taught position is issued in a format of "G202 P_ HP_ R_".

P_ in the taught position command system TM3 is a taught position, which indicates a position (a specified end point) to which the robot 60 is to be moved. HP_ in the taught position command system TM3 is a taught position of the auxiliary point HP for determining a circular arc shape. P_ and R_ in the taught position command system TM3 are the same as P_ and R_ in the taught position command system TM1.

Figure 12:
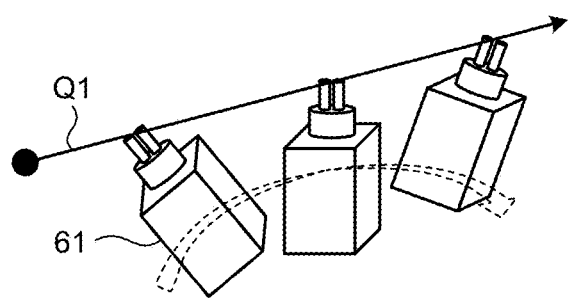
FIG. 12 is a diagram for explaining control on a robot when a direction angle is not set by the numerical control device according to the first embodiment.
Figure 13:
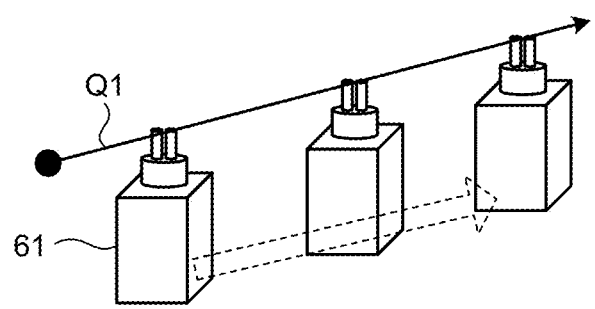
FIG. 13 is a diagram for explaining control on the robot when a direction angle is set by the numerical control device according to the first embodiment.

Next, control of a direction angle on the robot 60 will be described with reference to FIGS. 12 to 15. FIG. 12 is a diagram for explaining control on the robot when a direction angle is not set by the numerical control device according to the first embodiment. FIG. 13 is a diagram for explaining control on the robot when a direction angle is set by the numerical control device according to the first embodiment.

FIGS. 12 and 13 illustrate operations of the robot hand 61 of the robot 60 in a case where the numerical control device 1X performs linear interpolation. The direction angle is an angle of deviation relative to a reference direction Q1. Thus, when control of the direction angle is specified, the robot hand 61 moves in a direction parallel to the reference direction Q1 during linear interpolation movement as illustrated in FIG. 13. In other words, when control of the direction angle is specified, the robot hand 61 moves facing one direction. In contrast, when control of the direction angle is not specified, the robot hand 61 moves while changing its inclination at various angles relative to the reference direction Q1 during linear interpolation movement as illustrated in FIG. 12.

In a direction angle control parameter setting command, whether or not control of the direction angle is specified is indicated in a format of "G243.1 H_". H_ in "G243.1 H_" is a command specifying the "presence" or the "absence" of specification of control of the direction angle. H0 indicates that the specification of control of the direction angle is enabled, and H1 indicates that the specification of control of the direction angle is disabled.

The association between a command shaft (NC shaft) used in an NC program and a command shaft (robot shaft) used in a robot program will now be described. FIG. 14 is a table illustrating the association between an NC coordinate system and a robot coordinate system used by the numerical control device according to the first embodiment. FIG. 14 illustrates the association information 102, which is the association between an NC shaft in the NC coordinate system used in an NC program and a robot shaft in the robot coordinate system used in a robot program.

The association information 102 includes the association between an address set in an NC program and coordinates set in the robot coordinate system, and the association between a shaft name set in an NC program and a shaft name set in the robot coordinate system.

RX, RY, and RZ set in an NC program represent linear motion shafts, and RX, RY, and RZ correspond to X, Y, and Z, respectively, in the robot coordinate system. That is, the addresses of RX, RY, and RZ correspond to X, Y, and Z coordinates, respectively, in a robot program. Thus, for setting X, Y, and Z coordinates of the robot 60, values of X, Y, and Z can be set in addresses of RX, RY, and RZ in an NC program.

RA, RB, and RC set in an NC program represent rotating shafts, and RA, RB, and RC correspond to A, B, and C, respectively, in the robot coordinate system. That is, the addresses of RA, RB, and RC correspond to A, B, and C coordinates, respectively, in a robot program. Thus, for setting A, B, and C coordinates of the robot 60, values of A, B, and C can be set in addresses of RA, RB, and RC in an NC program.

RS and RT set in an NC program represent the postures of the robot 60, and the addresses of RS and RT correspond to S and T in a robot program. Thus, for setting the postures of S and T of the robot 60, values of S and T can be set in addresses of RS and RT in an NC program. A joint (rotating shaft) of the robot 60 is expressed by Ax=in an NC command and by Ax in the robot coordinates. FIG. 14 illustrates a case of six axes, x being 1 to 6.

As described above, in the numerical control device 1X, a command shaft (command coordinates) in an NC program and a command shaft (command coordinates) in a robot program are associated with each other in the association information 102. An NC program for the machine tool 70 and an NC robot program, which is an NC program for the robot 60, are stored in NC programs. The program converting unit 414 of the numerical control device 1X converts the NC robot program into the robot program on the basis of the association information 102, and controls the robot 60 by using the robot program.

Figure 15:
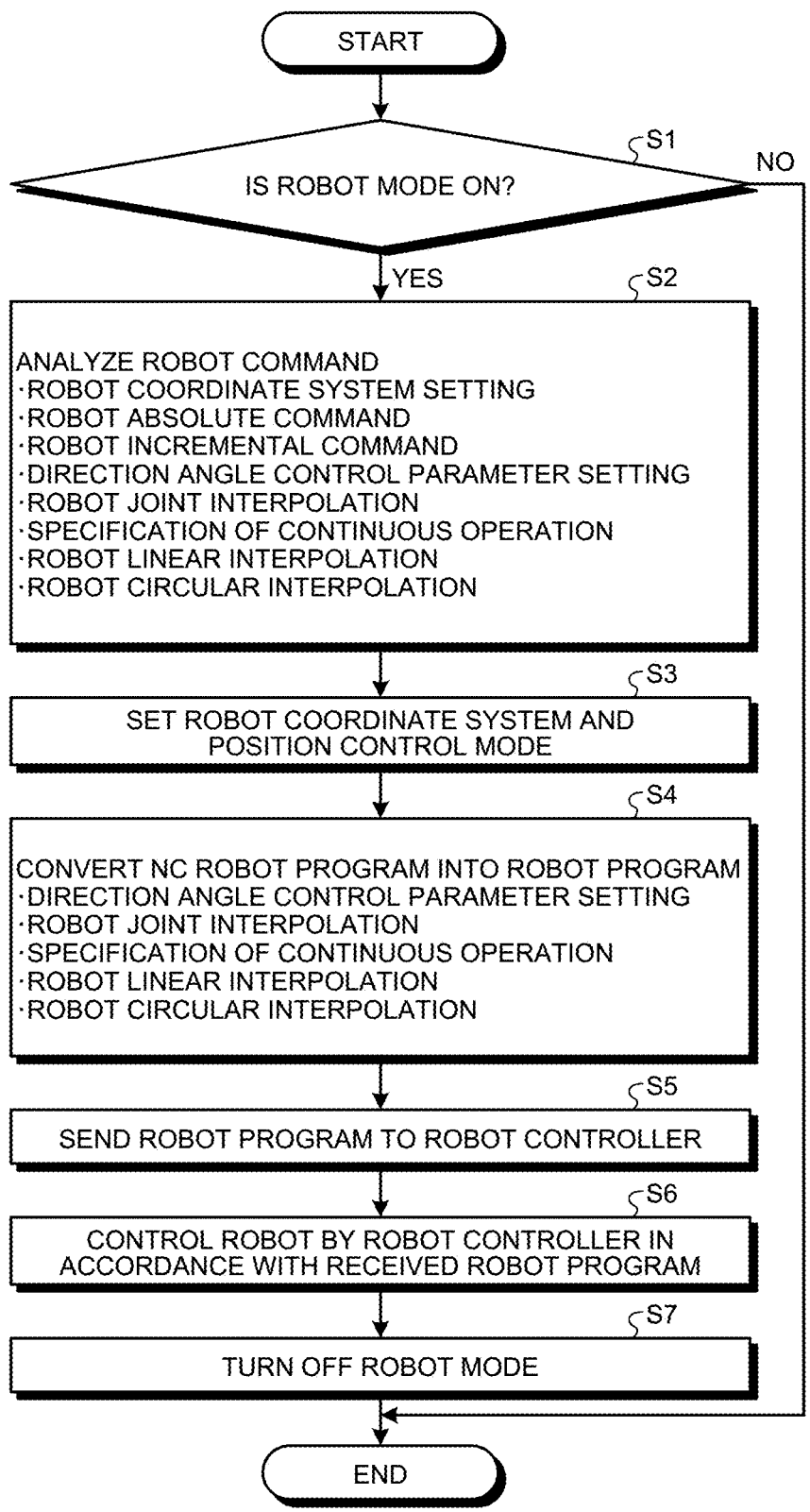
FIG. 15 is a flowchart illustrating procedures of robot control using NC programs performed by the control system according to the first embodiment.

Next, procedures of a process for converting an NC program into a robot program by the numerical control device 1X will be described. FIG. 15 is a flowchart illustrating procedures of robot control using NC programs performed by the control system according to the first embodiment.

The robot command analyzing unit 371 of the analysis processing unit 37 determines whether or not the robot mode is on (step S1). Specifically, the robot command analyzing unit 371 determines whether the mode of G198 is being executed (robot commands are enabled) or the mode of G199 is being executed (robot commands are disabled). The robot command analyzing unit 371 sends the analysis result to the mode setting unit 412 via the storage unit 34.

If the robot mode is off (step S1, No), the numerical control device 1X does not perform the process of converting an NC program into a robot program. If the robot mode is on (step S1, Yes), the mode setting unit 412 informs the program converting unit 414 that a command for the robot 60 will arrive thereafter.

The robot command analyzing unit 371 analyzes a command in a block following G198. Examples of commands to be analyzed by the robot command analyzing unit 371 are commands specifying the following (function 1) to (function 8) (step S2).

(function 1) robot coordinate system setting
(function 2) robot absolute command
(function 3) robot incremental command
(function 4) direction angle control parameter setting
(function 5) robot joint interpolation
(function 6) specification of continuous operation
(function 7) robot linear interpolation
(function 8) robot circular interpolation The robot command analyzing unit 371 sends the analysis result to the robot control unit 41X or the shared area 345 of the storage unit 34. For example, the robot command analyzing unit 371 sends, as the analysis result, a robot coordinate system setting command indicating setting of the robot coordinate system to the coordinate setting unit 411. In addition, the robot command analyzing unit 371 sends, as the analysis result, information indicating a position control mode, which is a control mode for position control, to the shared area 345 of the storage unit 34.

The numerical control device 1X thus sets the robot coordinate system and the position control mode (step S3). Specifically, the coordinate setting unit 411 sets the coordinate system of the robot 60 to the base coordinate system or the tool coordinate system on the basis of the robot coordinate system setting command. After the coordinate setting unit 411 sets the coordinate system associated with the robot coordinate system setting command, the robot control unit 41X operates the robot 60 in the set coordinate system. As a result, the robot 60 operates in the coordinate system set by the coordinate setting unit 411.

In addition, the robot command analyzing unit 371 stores, as the information indicating the position control mode, information indicating that the mode of a robot absolute command is being executed (absolute command being executed) or information indicating that the mode of a robot incremental command is being executed (incremental command being executed) in the shared area 345. As a result, the program converting unit 414 refers to, for each robot command, the information stored in the shared area 345 to check whether the absolute command is being executed or the incremental command is being executed. When the absolute command is being executed, the program converting unit 414 assumes a position command of a robot command as a robot absolute command, and when the incremental command is being executed, the program converting unit 414 assumes a position command of a robot command as a robot incremental command.

Subsequently, the program converting unit 414 performs program conversion of each operation on commands specifying the following (function 4) to (function 8) among robot commands sent from the robot command analyzing unit 371. In other words, the program converting unit 414 converts an NC robot program into a robot program (step S4).

(function 4) direction angle control parameter setting
(function 5) robot joint interpolation
(function 6) specification of continuous operation
(function 7) robot linear interpolation
(function 8) robot circular interpolation Subsequently, the program converting unit 414 sends the robot program obtained by the conversion to the robot controller 50X (step S5). The robot controller 50X controls the robot 60 in accordance with the robot program received from the program converting unit 414 (step S6).

Thereafter, when the robot command analyzing unit 371 analyzes a robot mode OFF command (G199), the numerical control device 1X turns off the robot mode, and terminates the control on the robot 60 (step S7).

Figure 16:
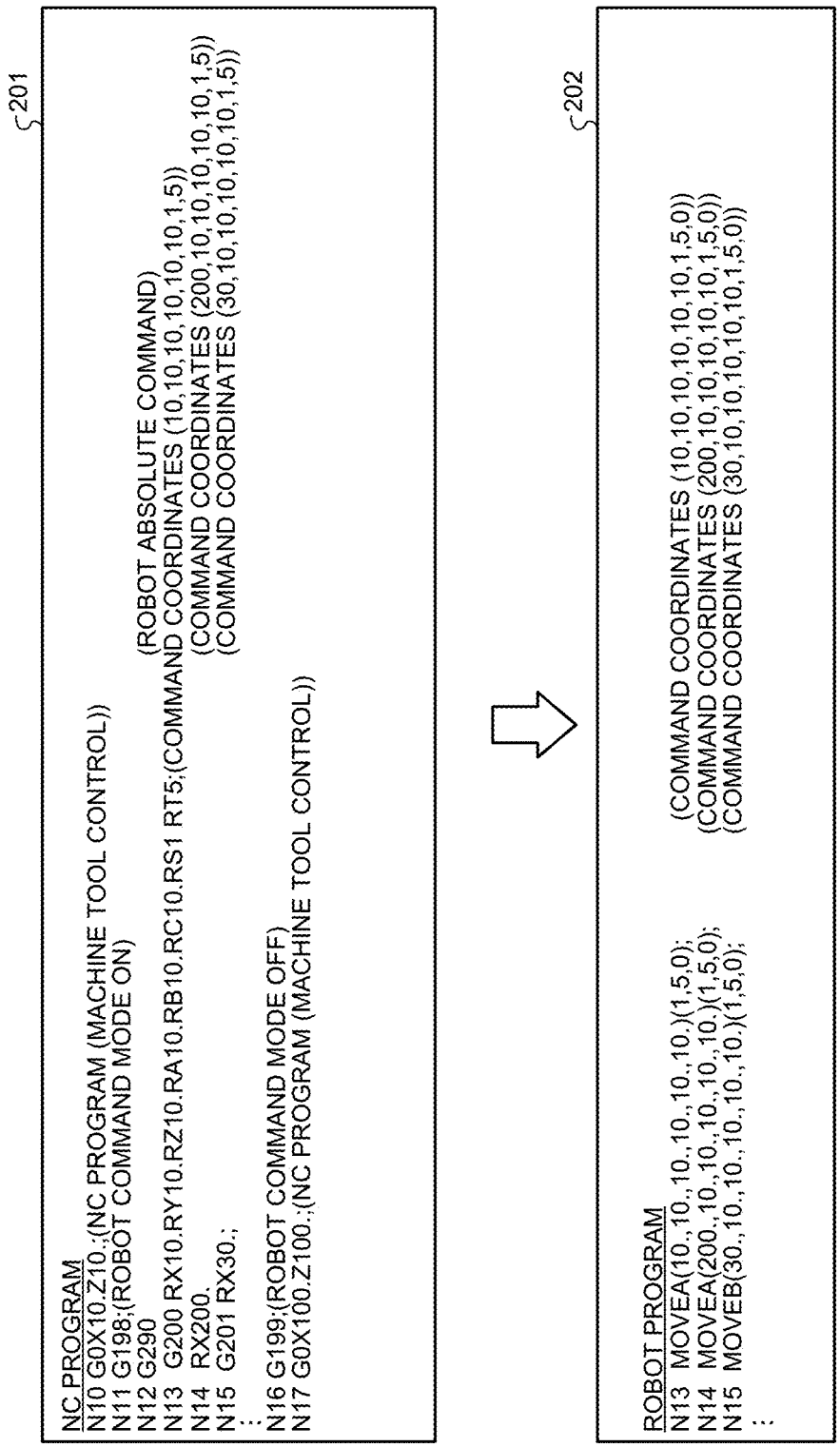
FIG. 16 is a diagram for explaining a process of converting an NC program into a robot program by the numerical control device according to the first embodiment.

An example of the process of converting an NC robot program into a robot program performed by the program converting unit 414 will now be described. FIG. 16 is a diagram for explaining the process of converting an NC program into a robot program by the numerical control device according to the first embodiment. FIG. 16 illustrates an NC program 201 before the conversion including an NC robot program, and a robot program 202 after the conversion. The program converting unit 414 converts an NC robot program included in the NC program 201 into a robot program 202.

After the robot command mode is turned on by G198 of N11, the program converting unit 414 converts an NC robot program until the robot command mode is turned off by G199 of N16 into a robot program.

"N13 G200 RX10. RY10. RZ10. RA10. RB10. RC10. RS1 RT5; (command coordinates (10, 10, 10, 10, 10, 10, 1, 5))" and "N14 RX200.; (command coordinates (200, 10, 10, 10, 10, 10, 1, 5))" included in the NC program 201 correspond to robot joint interpolation. The program converting unit 414 converts the robot joint interpolation into robot program instructions corresponding to the robot joint interpolation by using the robot command list information 101, the association information 102, the joint interpolation information 103, and the address information 104. Specifically, the program converting unit 414 converts N13 of the NC program 201 into "N13 MOVEA (10.,10.,10.,10.,10.,10.) (1,5,0); (command coordinates (10, 10, 10, 10, 10, 10, 1, 5, 0))". The program converting unit 414 also converts N14 of the NC program 201 into "N14 MOVEA (200.,10.,10.,10., 10.,10.) (1,5,0); (command coordinates (200, 10, 10, 10, 10, 10, 1, 5, 0))". Note that, because R_ is omitted in the NC program 201, the program converting unit 414 assumes that continuous operation is enabled in the robot program instructions.

In addition, "N15 G201 RX30.; (command coordinates (30, 10, 10, 10, 10, 10, 1, 5))" included in the NC program 201 corresponds to robot linear interpolation. The program converting unit 414 converts the robot linear interpolation into robot program instructions corresponding to the robot linear interpolation by using the robot command list information 101, the association information 102, the address information 104, and the linear interpolation information 105. Specifically, the program converting unit 414 converts N15 of the NC program 201 into "N15 MOVEB (30.,10., 10.,10.,10.,10.) (1,5,0); (command coordinates (30, 10, 10, 10, 10, 10, 1, 5, 0))". Note that, when robot circular interpolation is included in the NC program 201, the program converting unit 414 converts the robot circular interpolation into a robot program instruction expressed with MOVEC.

Figure 17:
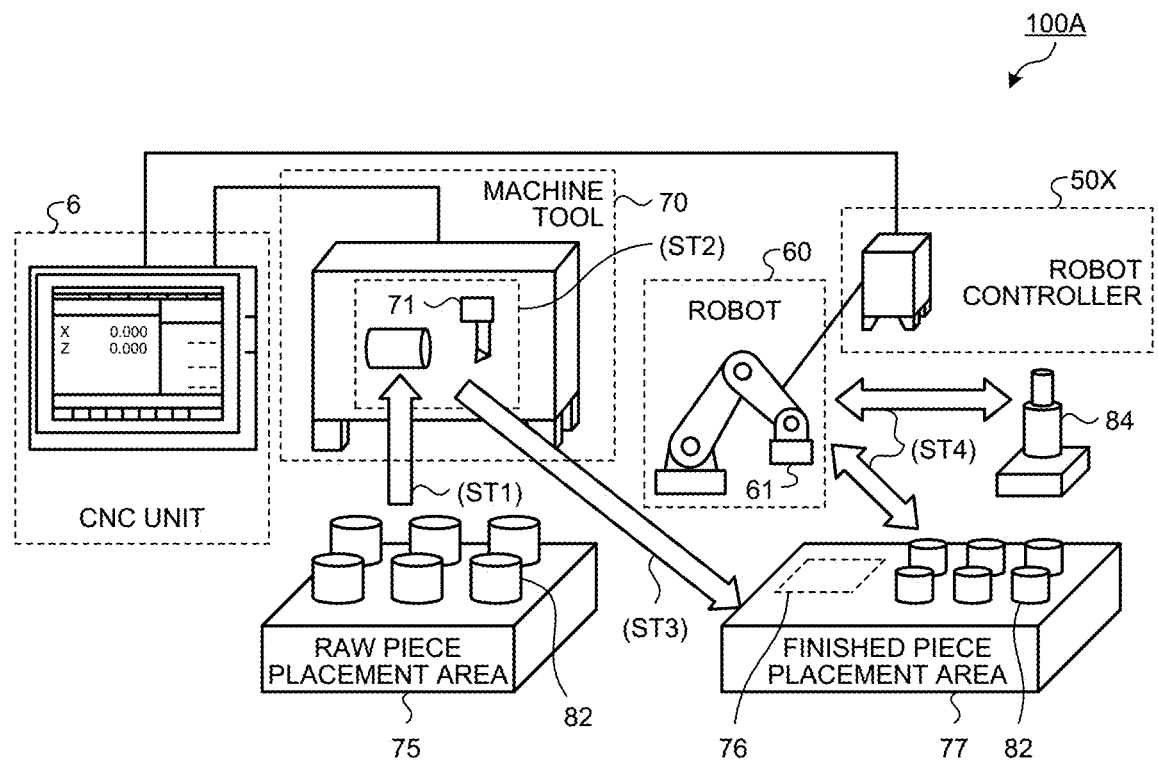
FIG. 17 is a diagram for explaining procedures of operation of a machine tool and a robot controlled by the numerical control device according to the first embodiment.

Next, cooperative operation of the machine tool 70 and the robot 60 will be described with reference to FIGS. 17 and 18. FIG. 17 is a diagram for explaining procedures of operation of the machine tool and the robot controlled by the numerical control device according to the first embodiment.

In control system 100A, the robot 60 loads a raw workpiece 82 placed in a raw piece placement area 75 onto the machine tool 70 (ST1). The machine tool 70 machines the workpiece 82 by using a tool 71 (ST2). The robot 60 then unloads the machined workpiece 82 (finished piece) from the machine tool 70 (ST3), and places the machined workpiece 82 in a temporary placement area 76 in a finished piece placement area 77. Thereafter, the robot 60 grips a deburring tool 84, which is an external tool, with the robot hand 61, and the deburring tool 84 deburrs the machined workpiece 82 (ST4). Note that, in the description below, a workpiece 82 that is not machined may be referred to as a raw workpiece, and a workpiece 82 that is machined may be referred to as a machined workpiece.

FIG. 18 is a diagram illustrating an NC program used when the operation illustrated in FIG. 17 is performed. An NC program 501 illustrated in FIG. 18 includes robot commands for performing the operation illustrated in FIG. 17.

A first system of the NC program 501 is an NC program describing the operation of the machine tool 70, and includes commands for causing the machine tool 70 to operate. A second system of the NC program 501 is an NC program (NC robot program) describing the operation of the robot 60, and includes robot commands for causing the robot 60 to operate. The first system and the second system can make the machine tool 70 and the robot 60 operate while providing coordination (synchronization) between the operation of the machine tool 70 and the operation of the robot 60.

Herein, sequence numbers (N numbers) described at the beginning of the individual NC programs will be used in the explanation instead of such terms as an NC program in the first system and an NC program in the second system. Hereinafter, the processing in the numerical control device 1X, the operation of the robot 60, and the operation of the machine tool 70 when the commands are executed by the numerical control device 1X will be described. Note that description of details of instructions from the numerical control device 1X to the robot 60 and details of instructions from the numerical control device 1X to the machine tool 70 may be omitted.

<Processing Before Waiting in N110 and N550>

In N500, the numerical control device 1X executes a robot mode ON command to turn on the robot mode.

In N510, the numerical control device 1X sets robot coordinates.

In N520, the robot 60 moves to the position for grasping a raw workpiece.

In N530, the robot 60 grasps a raw workpiece.

In N540, the robot 60 positions the raw workpiece at a loading position.

In N550, the robot 60 waits for a chuck grasping the workpiece 82 at the machine tool 70 to open.

In N100, the machine tool 70 opens the chuck, and in N110, the numerical control device 1X informs a robot command that the chuck of the machine tool 70 has opened. The numerical control device 1X herein informs "!1L1" (wait for chuck to open) in N550 that the chuck of the machine tool 70 has opened. The operations in N110 and N550 are performed between the robot command waiting unit 381 of the interpolation processing unit 38 and the NC command waiting unit 413 of the robot control unit 41X via the storage unit 34.

Specifically, the robot command waiting unit 381 stores, in the storage unit 34, information indicating that N110 is executed, and the NC command waiting unit 413 stores, in the storage unit 34, information indicating that N550 is executed. In addition, the robot command waiting unit 381 reads, from the storage unit 34, the information indicating that N550 is executed, and the NC command waiting unit 413 reads, from the storage unit 34, the information indicating that N110 is executed.

After executing N110 and reading the information indicating that N550 is executed from the storage unit 34, the robot command waiting unit 381 performs a process in a block following N110. After executing N550 and reading the information indicating that N110 is executed from the storage unit 34, the NC command waiting unit 413 performs a process in a block following N550. Thus, the numerical control device 1X executes N120 and N560 after executing both of N110 and N550. In this manner, the robot 60 waits to perform the next process until the chuck is opened by the machine tool 70.

Wait commands used in N110 and N550 will now be described. "!2L1" and "!1L1" are wait commands (synchronizing instructions), and the numerical control device 1X does not perform the process in the block following N110 and the process in the block following N550 before both of "!2L1" and "!1L1" are executed. Thus, when a wait command is present, the numerical control device 1X synchronizes the operation of the machine tool 70 and the operation of the robot 60 with each other.

The numerical control device 1X waits processes in the first system when "m" in "!mLn" is "1", and waits processes in the second system when "m" is "2". Specifically, when a command (!2Ln: first standby command) to wait for the operation of the robot 60 appears in a command for the machine tool 70 during execution of the command for the machine tool 70, the robot command waiting unit 381 waits for the operation of the robot 60. In other words, the robot command waiting unit 381 keeps the operation of the machine tool 70 on standby until the operation (!1Ln) of the robot 60 associated with the first standby command is completed.

In addition, when a command (!1Ln: second standby command) to wait for the operation of the machine tool 70 appears in a command for the robot 60 during execution of the command for the robot 60, the NC command waiting unit 413 waits for the operation of the machine tool 70. In other words, the NC command waiting unit 413 keeps the operation of the robot 60 on standby until the operation (!2Ln) of the machine tool 70 associated with the second standby command is completed. As described above, when such a wait command as "!1Ln" and "!2Ln" is present, the control computation unit 2X synchronizes the machine tool 70 and the robot 60 with each other.

"n" (n is a natural number) in "!mLn" is an identification number of the wait command, and the waiting process is performed between commands with the same identification number. Subsequently, when wait commands are executed in the NC program 501, waiting is performed through operations similar to N110 and N550, and detailed description of waiting processes will therefore be omitted in the description below. While such description as "!2L1" and "!1L1" are used as wait commands in the present embodiment, the descriptions of wait commands are not limited to "!2L1" and "!1L1", and may be other character codes.

<Processing Before Waiting in N120 and N570>

In N560, the robot 60 loads a raw workpiece on the chuck of the machine tool 70. In N570, the robot 60 waits for the operation of the machine tool 70 (!1L2), and in N120, the machine tool 70 waits for the operation of the robot 60 (!2L2). Specifically, the machine tool 70 waits for the raw workpiece to be loaded by the robot 60.

<Processing Before Waiting in N140 and N580>

The numerical control device 1X executes N130 and N580 after executing both of N120 and N570. In N130, the machine tool 70 closes the chuck to grasp the raw workpiece. In N140, the machine tool 70 waits for the operation of the robot 60 (!2L3), and in N580, the robot 60 waits for the operation of the machine tool 70 (!1L3). Specifically, the robot 60 waits for the machine tool 70 to close the chuck.

<Processing Before Waiting in N150 and N610>

The numerical control device 1X executes N150 and N590 after executing both of N140 and N580. Specifically, after the machine tool 70 closes the chuck, the robot 60 opens the robot hand 61 in N590. As a result, the robot 60 releases the raw workpiece. In N600, the robot 60 retracts the robot hand 61 to the outside of the machine tool 70.

In N610, the robot 60 waits for the operation of the machine tool 70 (!1L4), and in N150, the machine tool 70 waits for the operation of the robot 60 (!2L4). Specifically, the machine tool 70 waits for the robot hand 61 to move to the outside of the machine tool 70 and for the loading of the raw workpiece to be completed.

<Processing Before Waiting in N220 and N620>

The numerical control device 1X executes N160 and N620 after executing both of N150 and N610. Specifically, when the loading of the raw workpiece is completed, the machine tool 70 closes an automatic door through which the workpiece 82 passes when being loaded in N160. Thereafter, the machine tool 70 performs processes associated with N170 to N210, that is, machining of the workpiece 82.

In N220, the machine tool 70 waits for the operation of the robot 60 (!2L5), and in N620, the robot 60 waits for the operation of the machine tool 70 (!1L5). Specifically, the robot 60 waits for the machine tool 70 to complete machining of the workpiece 82.

<Processing Before Waiting in N240 and N630>

The numerical control device 1X executes N230 and N630 after executing both of N220 and N620. Specifically, when the machine tool 70 has completed machining, the machine tool 70 opens the automatic door in N230. In N240, the machine tool 70 waits for the operation of the robot 60 (!2L6), and in N630, the robot 60 waits for the operation of the machine tool 70 (!1L6). Specifically, the robot 60 waits for the machine tool 70 to complete opening of the automatic door.

<Processing Before Waiting in N250 and N680>

The numerical control device 1X executes N240 and N640 after executing both of N240 and N630. Specifically, when the machine tool 70 opens the automatic door, the robot 60 moves the robot hand 61 to the front of the chuck of the machine tool 70 in N640. In N650, the robot 60 opens the robot hand 61, in N660, the robot 60 moves the robot hand 61 to the grasping position of the machined workpiece, and in N670, the robot 60 closes the robot hand 61 to grasp the machined workpiece.

In N680, the robot 60 waits for the operation of the machine tool 70 (!1L7), and in N250, the machine tool 70 waits for the operation of the robot 60 (!2L7). Specifically, the machine tool 70 waits for the robot 60 to grasp the machined workpiece.

<Processing Before Waiting in N270 and N690>

The numerical control device 1X executes N260 and N690 after executing both of N250 and N680. Specifically, when the robot 60 closes the robot hand 61, the machine tool 70 releases the chuck in N260. In N270, the machine tool 70 waits for the operation of the robot 60 (!2L8), and in N690, the robot 60 waits for the operation of the machine tool 70 (!1L8). Specifically, the robot 60 waits for the machine tool 70 to open the chuck.

<Processing Before Waiting in N290 and N720>

The numerical control device 1X executes N280 and N700 after executing both of N270 and N690. Specifically, when the robot 60 closes the robot hand 61, the machine tool 70 replaces the tool 71 in N280, the robot 60 retracts the robot hand 61 grasping the machined workpiece to above the machine tool 70 in N700, and the robot 60 moves the robot hand 61 grasping the machined workpiece to the front of the automatic door in N710.

In N720, the robot 60 waits for the operation of the machine tool 70 (!1L9), and in N290, the machine tool 70 waits for the operation of the robot 60 (!2L9). Specifically, the robot 60 waits for the machine tool 70 to replace the tool 71, and the machine tool 70 waits for the robot 60 to unload the workpiece 82. The process of unloading the workpiece 82 herein is a process of retracting the machined workpiece to above the machine tool 70, and moving the robot hand 61 grasping the machined workpiece to the front of the automatic door.

<Processing after Waiting in N290 and N720>

When the robot 60 moves the robot hand 61 to the front of the automatic door, the machine tool 70 closes the automatic door in N300. In addition, when the machine tool 70 replaces the tool 71, the robot 60 moves the machined workpiece to the temporary placement area 76 in N730, the robot 60 temporarily places the machined workpiece in the temporary placement area 76 in N740, and the robot 60 opens the robot hand 61 in N750. As a result, the robot hand 61 releases and places the machined workpiece in the temporary placement area 76.

In N760, the robot 60 moves the robot hand 61 to a tool rest, and in N770, the robot 60 grasps the deburring tool 84. In N780, the robot 60 moves the deburring tool 84 grasped with the robot hand 61 to the temporary placement area 76 for the machined workpiece, and in N790, the robot 60 deburrs the machined workpiece with the deburring tool 84.

The numerical control device 1X controls the robot 60 and the machine tool 70 by using the NC program 501 illustrated in FIG. 18. In this case, the numerical control device 1X converts the robot commands in the second system into a robot program to control the robot 60. As a result, the user of the control system 100A can create NC robot programs from NC programs without the knowledge of robot programs, and control the robot 60 by using the NC programs, which improves the work efficiency such as setups. In addition, because robot programs are described in NC programs, synchronous operations of the machine tool 70 and the robot 60 at specific timings (at activation of the robot 60, during the operation of the robot 60, and at completion of the operation of the robot 60) can be easily programmed, which improves the work efficiency such as setups.

In a case where the numerical control device 1X of the present embodiment is not used, the user of the robot needs to create robot programs in addition to NC programs. In this case, the user who uses both of the machine tool and the robot needs to have the knowledge of both of NC programs and robot programs. Thus, in the case where the numerical control device 1X is not used, the robot cannot be controlled without the knowledge of robot programs. In contrast, in the case where the numerical control device 1X is used, the user of the control system 100A can control the machine tool 70 and the robot 60 only with the knowledge of NC programs.

As described above, according to the first embodiment, commands for the robot 60 in NC programs are converted into robot programs on the basis of the association information 102, which is the association between NC programs and robot programs, and this enables control of the robot 60 by using NC programs.

In addition, because the numerical control device 1X includes the robot command waiting unit 381 and the NC command waiting unit 413, the machine tool 70 and the robot 60 can be synchronized with each other even when both of an NC program and a robot program are executed at the same time.

In addition, with the present embodiment, an NC program and a robot program can be placed side by side and checked as in FIG. 18, which enables synchronous processes of the machine tool 70 and the robot 60 to be easily checked during programming.

In a case where NC programs and robot programs are created separately as in the related art, a memory for storing the robot programs is needed in addition to the memory for storing the NC programs; with the present embodiment, however, the memory for storing robot programs is unnecessary, which enables the device configuration to be simplified.

Second Embodiment

Next, a second embodiment of the present invention will be described with reference to FIGS. 19 to 21. In the second embodiment, the robot controller includes a robot interface (IF) capable of controlling the robot 60 on the basis of command coordinates input by the numerical control device. The numerical control device accesses the robot IF and inputs command coordinates to the robot IF to cause the robot IF to control the robot 60.

Figure 19:
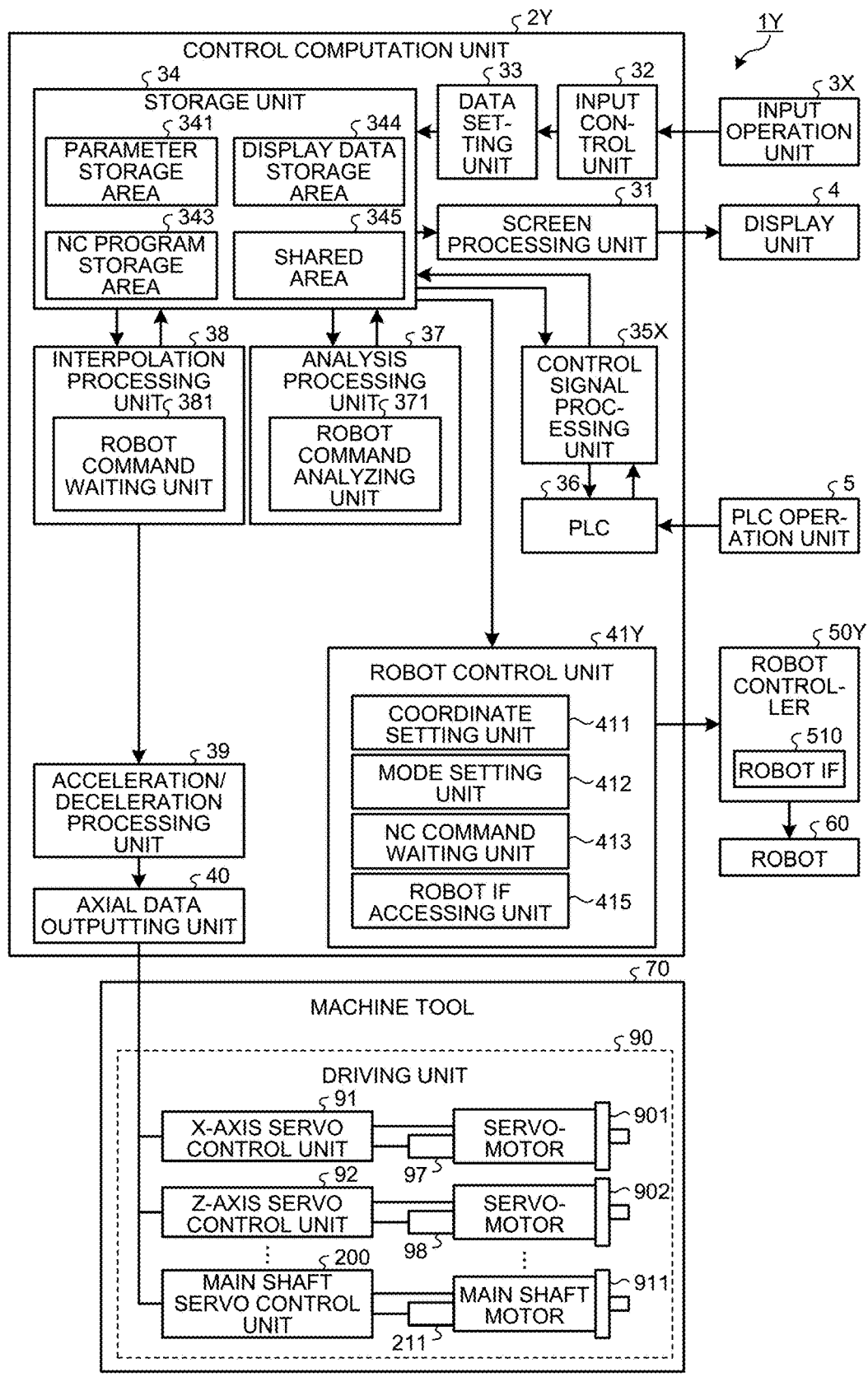
FIG. 19 is a diagram illustrating an example of a configuration of a numerical control device according to a second embodiment.
Figure 20:
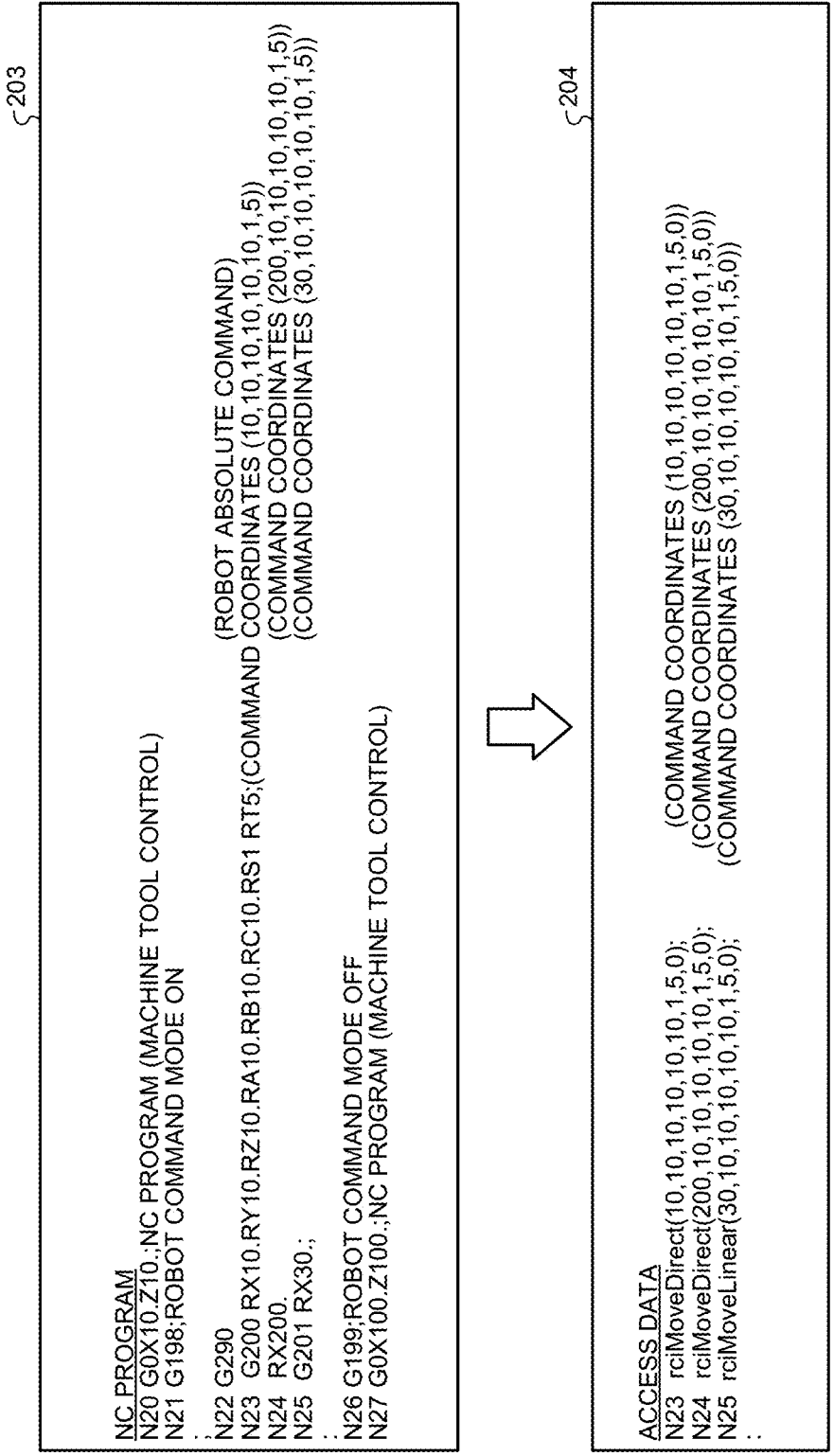
FIG. 20 is a diagram for explaining a process of accessing a robot IF by the numerical control device according to the second embodiment.

FIG. 19 is a diagram illustrating an example of a configuration of the numerical control device according to the second embodiment. Among the components in FIG. 19, components that achieve the same functions as those of the numerical control device 1X of the first embodiment illustrated in FIG. 2 are represented by the same reference numerals, and redundant description thereof will not be repeated.

A numerical control device 1Y according to the second embodiment includes a control computation unit 2Y instead of the control computation unit 2X in the numerical control device 1X. Furthermore, the numerical control device 1Y includes a robot controller 50Y instead of the robot controller 50X in the numerical control device 1X.

The robot controller 50Y includes a robot IF 510. The robot IF 510 is connected with the robot 60, and controls the robot 60. In the robot IF 510, a function is assigned to each content of control of the robot 60. Specifically, in the robot IF 510, an operation instruction to the robot 60 is associated with a function.

When a function is specified by the control computation unit 2Y, the robot IF 510 instructs the robot 60 to perform the operation associated with the specified function. Specifically, when command coordinates (argument) are specified for a function for controlling the robot 60 by control computation unit 2Y, the robot IF 510 controls the robot 60 on the basis of the specified command coordinates. In other words, upon being accessed by the control computation unit 2Y, the robot IF 510 performs a preset process on the robot 60. Thus, upon being accessed with a function and command coordinates defined in the coordinate system of the robot 60, the robot IF 510 performs a process associated with the function and the command coordinates on the robot 60.

The functions assigned to contents of control of the robot 60 include a function used for robot joint interpolation, a function used for robot linear interpolation, a function used for robot circular interpolation, and the like. Because the robot 60 performs a plurality of kinds of operations, a plurality of kinds of functions are set for the robot IF 510.

The control computation unit 2Y includes a robot control unit 41Y instead of the robot control unit 41X in the control computation unit 2X. The robot control unit 41Y includes a robot IF accessing unit 415 instead of the program converting unit 414.

The robot IF accessing unit 415 determines a function to be used for control of the robot 60 and calculates command coordinates to be used for control of the robot 60 on the basis of an NC robot program in an NC program. The robot IF accessing unit 415, which is an accessing unit for accessing the robot IF 510, specifies the function for control of the robot 60, and then inputs the command coordinates to the robot IF 510. In other words, the robot IF accessing unit 415 accesses the robot IF 510 with the function and the command coordinates associated with the NC robot program.

While the program converting unit 414 converts robot commands in an NC program into a robot program and sends the robot program to the robot controller 50X in the first embodiment, the robot IF accessing unit 415 directly accesses the robot IF 510 and inputs command coordinates thereto in the second embodiment.

An example of accessing the robot IF 510 by the robot IF accessing unit 415 will now be described. FIG. 20 is a diagram for explaining a process of accessing the robot IF by the numerical control device according to the second embodiment. FIG. 20 illustrates an NC programs 203 before conversion including an NC robot program, and access data 204 used in accessing the robot IF 510. The NC program 203 is a program including commands similar to those in the NC program 201 described in FIG. 16 of the first embodiment, and is different therefrom only in block numbers.

The robot IF accessing unit 415 stores the access data 204. The access data 204 are data for accessing the robot IF 510, and include a function specifying the operation of the robot 60 and command coordinates (data) to be used for controlling the robot 60.

After the robot command mode is turned on by G198 of N21, the robot IF accessing unit 415 accesses the robot IF 510 for an NC robot program until the robot command mode is turned off by G199 of N26. Specifically, the robot IF accessing unit 415 extracts the function and the data included in the access data 204 and accesses (calls and executes) the robot IF 510 with the extracted function and data on the basis of the association information 102 and the NC robot program included in the NC program 203. The NC program 203 includes commands N23, N24, and N25 as commands of the NC robot program.

"N23 G200 RX10. RY10. RZ10. RA10. RB10. RC10. RS1 RT5; (command coordinates (10, 10, 10, 10, 10, 10, 1, 5))" and "N24 RX200. (command coordinates (200, 10, 10, 10, 10, 10, 1, 5))" included in the NC program 203 are commands of robot joint interpolation. The robot IF accessing unit 415 extracts a function associated with robot joint interpolation on the basis of the commands of robot joint interpolation, and accesses the robot IF 510 with the extracted function.

Specifically, the robot IF accessing unit 415 accesses the robot IF 510 with "N23 rciMoveDirect(10,10,10,10,10,10, 1,5,0); (command coordinates (10, 10, 10, 10, 10, 10, 1, 5, 0))" in response to the command N23 described above. rciMoveDirect is a function for specifying robot joint interpolation for the robot IF 510.

In addition, the robot IF accessing unit 415 accesses the robot IF 510 with "N24 rciMoveDirect (200,10,10,10,10, 10,1,5,0); (command coordinates (200, 10, 10, 10, 10, 10, 1, 5, 0))" in response to the command N24 described above.

As a result of the access of the robot IF accessing unit 415 to the robot IF 510, the robot IF 510 performs communication associated with the access. The robot controller 50Y thus controls the robot 60 in accordance with the command coordinates included in the function. Specifically, the robot controller 50Y causes the robot 60 to perform the operation (robot joint interpolation) associated with the access. As a result, the robot 60 moves to a target value while being subjected to joint interpolation.

In addition, "N25 G201 RX30.; (command coordinates (30, 10, 10, 10, 10, 10, 1, 5))" included in the NC program 203 corresponds to a command of robot linear interpolation. The robot IF accessing unit 415 generates a function associated with robot linear interpolation on the basis of the command of robot linear interpolation, and accesses the robot IF 510 with the generated function.

Specifically, the robot IF accessing unit 415 accesses the robot IF 510 with "N25 rciMoveLinear (30,10,10,10,10,10, 1,5,0); (command coordinates (30, 10, 10, 10, 10, 10, 1, 5, 0))" in response to the command N25 described above. rciMoveLinear is a function for specifying robot linear interpolation for the robot IF 510. As a result of the access of the robot IF accessing unit 415 to the robot IF 510, the robot IF 510 causes the robot 60 to perform the operation (robot linear interpolation) associated with the access. The robot IF 510 controls the robot 60 in accordance with the command coordinates included in the function. As a result, the robot 60 moves to a target value while being subjected to linear interpolation.

Next, procedures of a process of generating access data from an NC program by the numerical control device 1Y will be described. FIG. 21 is a flowchart illustrating the procedures of the process of generating access data by the numerical control device according to the second embodiment. Herein, a process of creating a function and command coordinates in access data by the numerical control device 1Y, and accessing the robot IF 510 in accordance with the function and the command coordinates will be described.

Figure 21:
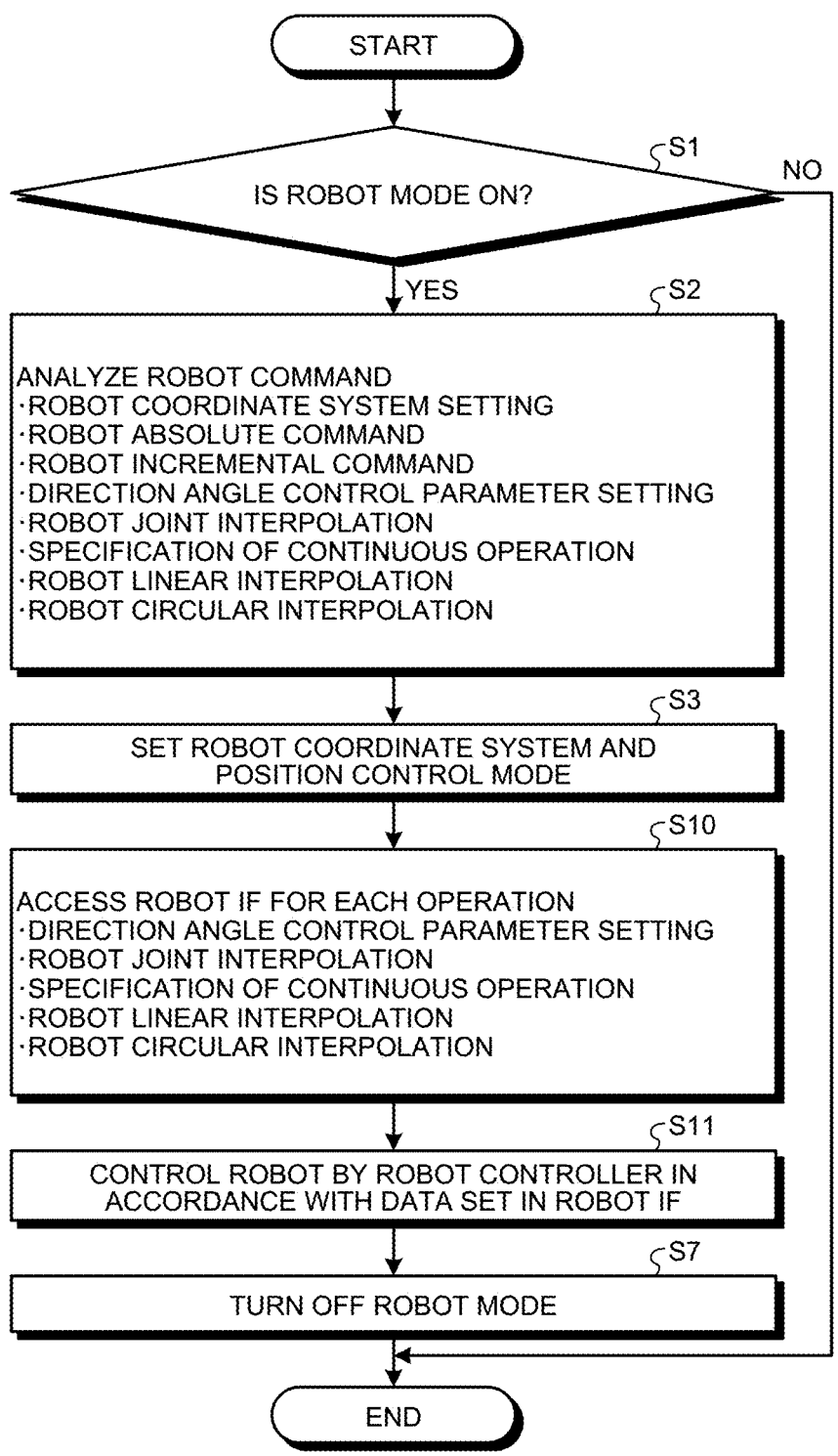
FIG. 21 is a flowchart illustrating procedures of a process of generating access data by the numerical control device according to the second embodiment.

The processes in steps S1 to S3 illustrated in FIG. 21 are the same as those described in FIG. 15 of the first embodiment. After the process in step S3, the robot IF accessing unit 415 determines a function to be specified when accessing the robot IF 510 for each kind of operation on the basis of an NC robot program in an NC program. In this function, command coordinates corresponding to those set in the NC robot program are set. The robot IF accessing unit 415 specifies the determined function and accesses the robot IF 510. The robot IF accessing unit 415 accesses the robot IF 510 (step S10), specifies a function associated with each operation of the following (function 4) to (function 8), for example, and inputs the command coordinates.

(function 4) direction angle control parameter setting
(function 5) robot joint interpolation
(function 6) specification of continuous operation
(function 7) robot linear interpolation
(function 8) robot circular interpolation When the robot IF accessing unit 415 inputs the command coordinates to robot IF 510 with the specified function, the robot IF 510 sets data of the command coordinates in the specified function. The robot controller 50Y controls the robot 60 in accordance with the data set in the robot IF 510 (step S11).

Thereafter, when the robot command analyzing unit 371 analyzes a robot mode OFF command (G199), the numerical control device 1Y turns off the robot mode, and terminates the control on the robot 60 (step S7).

As described above, according to the second embodiment, the user without the knowledge of robot programs can control the robot 60 by using NC programs by creating commands for the robot 60 from NC programs, which improves the work efficiency such as setups.

Third Embodiment

Next, a third embodiment of the present invention will be described with reference to FIGS. 22 to 24. In the third embodiment, a display screen displayed on the display unit 4 located in the machine tool 70 enables editing of an NC robot program and checking of the state of the robot 60.

Figure 22:
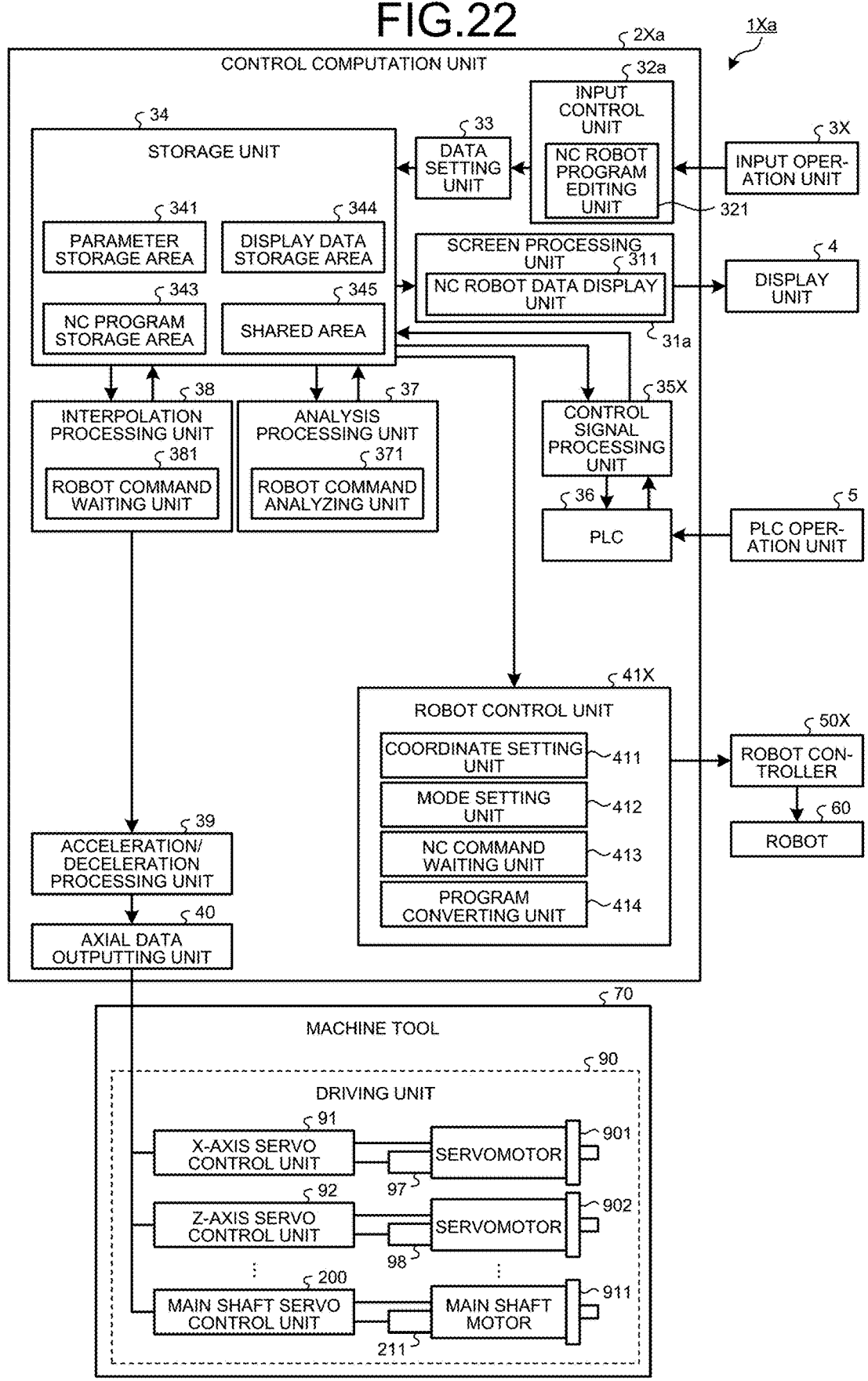
FIG. 22 is a diagram illustrating an example of a configuration of a numerical control device according to a third embodiment.

FIG. 22 is a diagram illustrating an example of a configuration of a numerical control device according to the third embodiment. Among the components in FIG. 22, components that achieve the same functions as those of the numerical control device 1X of the first embodiment illustrated in FIG. 2 are represented by the same reference numerals, and redundant description thereof will not be repeated.

A numerical control device 1Xa according to the third embodiment includes a control computation unit 2Xa instead of the control computation unit 2X in the numerical control device 1X. In addition, as compared with the control computation unit 2X, the control computation unit 2Xa includes an input control unit 32a instead of the input control unit 32, and a screen processing unit 31a instead of the screen processing unit 31.

The input control unit 32a includes an NC robot program editing unit 321, and the screen processing unit 31a includes an NC robot data display unit 311. The NC robot program editing unit 321 edits an NC robot program on the basis of information input to the input operation unit 3X by the user. The NC robot program editing unit 321 stores the edited NC robot program in the storage unit 34 via the data setting unit 33. The NC robot data display unit 311 reads the edited NC robot program from the storage unit 34 and displays the edited NC robot program on the display unit 4. In addition, the display unit 4 of the numerical control device 1Xa displays an editing screen 401 and a robot state display screen 402, which will be described later.

Figure 23:
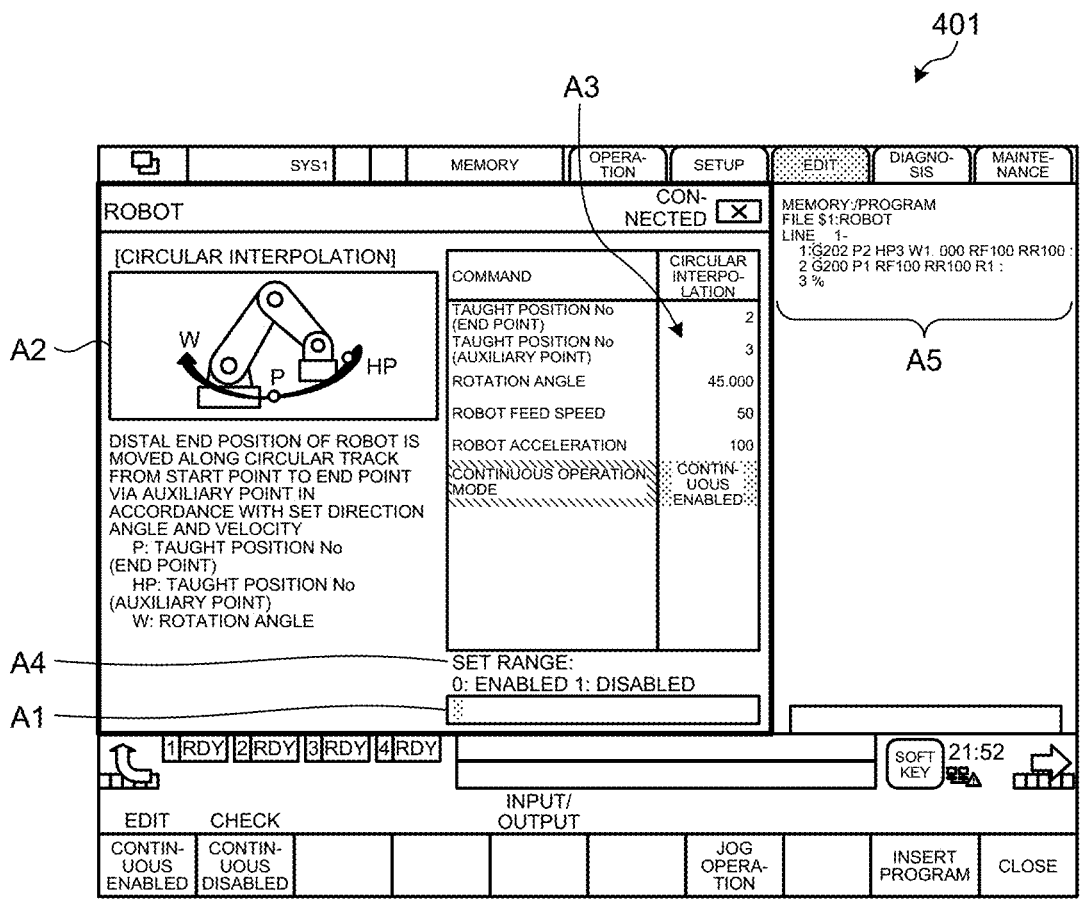
FIG. 23 is a diagram illustrating an example of an editing screen for an NC robot program displayed by the numerical control device according to the third embodiment.

FIG. 23 is a diagram illustrating an example of the editing screen for an NC robot program displayed by the numerical control device according to the third embodiment. FIG. 23 illustrates the editing screen 401, which is a screen displayed for editing an NC robot program. The editing screen 401 displays an input region A1, a guidance display region A2, a command setting data input region A3, a help display region A4, and an edited content display region A5.

The input region A1 is a region in which a content input as an NC robot program is displayed. The NC robot program is displayed in the edited content display region A5. Characters are input with an input device such as a keyboard in a state where a cursor is present in the edited content display region A5, whereby an NC robot program can be created. The guidance display region A2 is a region for displaying the operation of a robot command, the meaning of a setting item, and the like in a form of an image and guidance. The content displayed in the guidance display region A2 is switched depending on a selected robot command.

The command setting data input region A3 is a region for displaying data (numerical values, etc.) of a robot command to be created upon input of the data. The help display region A4 is a region for displaying the meaning of a setting item and the range of a setting at the cursor position. The edited content display region A5 is a region for displaying an edited NC robot program. On the editing screen 401, the edited content display region A5 is located in an area on the right of the editing screen 401. When an input key is pressed, an edited NC robot program is displayed in the edited content display region A5.

Input of data to the editing screen 401 is made by input of data to the input operation unit 3X. A code or the like input to the input operation unit 3X is sent to the NC robot program editing unit 321. The NC robot program editing unit 321 performs a process associated with the code input to the input operation unit 3X to edit the NC robot program. The NC robot program edited by the NC robot program editing unit 321 is stored in the NC program storage area 343 of the storage unit 34.

In addition, the NC robot data display unit 311 reads the edited NC robot program from the NC program storage area 343 and displays the edited NC robot program on the display unit 4.

During operation of the robot 60, the state of the robot 60 and the data of the robot 60 can be checked on the robot state display screen displayed on the display unit 4. A state display screen for displaying the state of the robot 60, that is, a robot state display screen will now be described.

Figure 24:
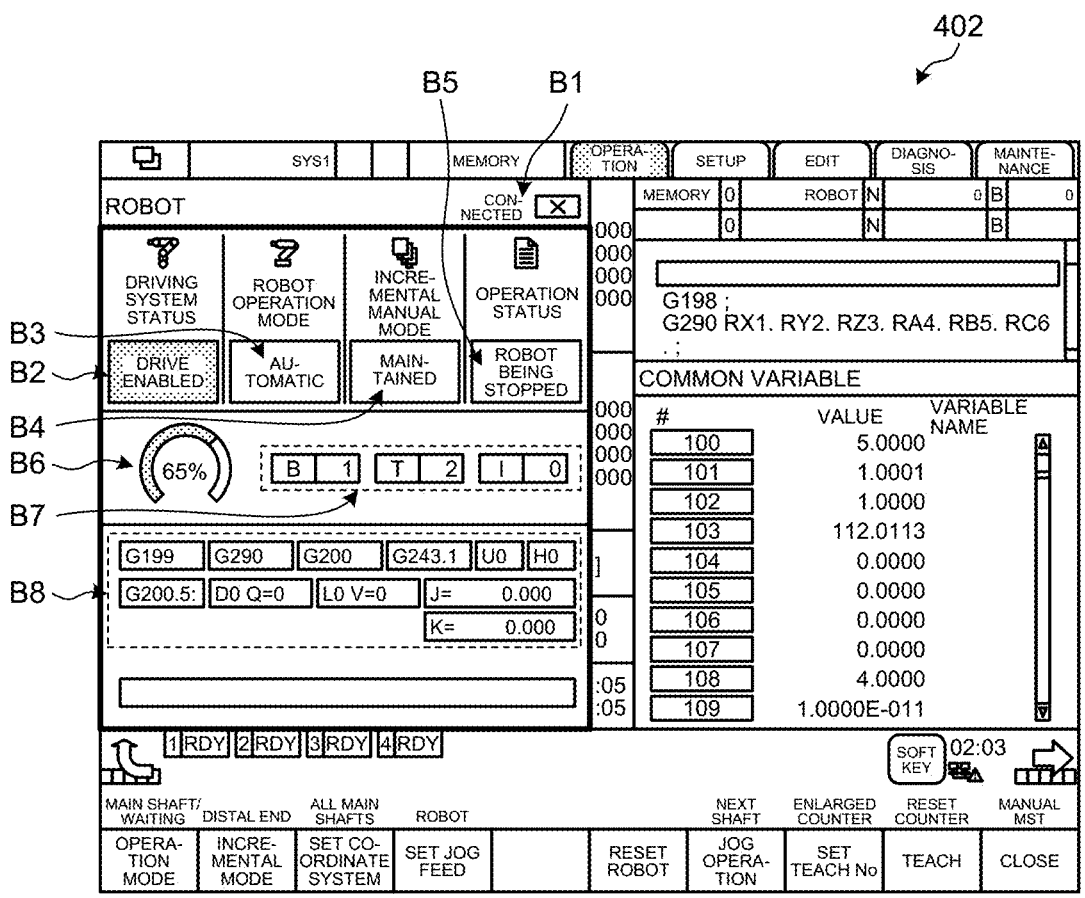
FIG. 24 is a diagram illustrating an example of a robot state display screen displayed by the numerical control device according to the third embodiment.

FIG. 24 is a diagram illustrating an example of the robot state display screen displayed by the numerical control device according to the third embodiment. The robot state display screen 402 displays the following contents (B1) to (B8).

(B1) robot controller connection state
(B2) robot controller status
(B3) operation mode
(B4) manual mode
(B5) robot operation status
(B6) robot override
(B7) robot coordinate system display
(B8) modal display (B1)
The robot controller connection state indicates whether or not the robot controller 50X is connected with the robot 60.
(B2)
The robot controller status indicates the state of the robot controller 50X.
(B3)
The operation mode indicates the operation mode of the robot 60. The operation mode is an automatic operation mode or a manual operation mode.
(B4)
The manual mode indicates whether or not a robot incremental command can be input manually when the operation mode is the manual operation mode.
(B5)
The robot operation status indicates the operation state of the robot 60. The robot operation status is the robot 60 being stopped or the robot 60 in operation.
(B6)
The robot override indicates the state of an override switch. The override switch is a switch for multiplying the feed speed specified in the NC programs by a scale factor. The override switch is located in the input operation unit 3X. In FIG. 22, the override switch is not illustrated.

The override switch is a switch for multiplying the feed speed specified in an NC robot program by a scale factor (override). Alternatively, the override switch may multiply the feed speed specified in an NC program for the machine tool 70 by a scale factor.

An override control unit (not illustrated in FIG. 22) included in the control computation unit 22 detects the operation state of the override switch, and sends a proportion (%) corresponding to the detected state and the speed data to the robot control unit 41X. When data of 10%, for example, are received, the robot control unit 41X sets the speed of the robot 60 to be 10% of the speed indicated by speed data, and sends the speed data to the robot controller 50X.
(B7)
The robot coordinate system display indicates the coordinate system set as the coordinate system of the robot 60. FIG. 24 illustrates a case where the type of the base coordinate system (B) is a type represented by "1", the type of the tool coordinate system (T) is a type represented by "2", and the tool type (I) of the tool coordinate system is a type represented by "0". When the base coordinate system is specified by a robot coordinate system setting command, the numerical control device 1Xa operates the robot 60 in the base coordinate system of the type represented by "1", and when the tool coordinate system is specified by a robot coordinate system setting command, the numerical control device 1Xa operates the robot 60 in the tool coordinate system of the type represented by "2".
(B8)
The modal display indicates a modal command being executed.

In the numerical control device 1Xa, the NC robot data display unit 311 reads data relating to the robot 60 stored together in the display data storage area 344 of the storage unit 34, and displays the data on the display unit 4.

As described above, the user of the numerical control device 1Xa need not edit an NC robot program and check the state of the robot 60 for the robot controller 50X, and the numerical control device 1Xa can edit an NC robot program and display the state of the robot 60. The work efficiency of programming is therefore improved.

Fourth Embodiment

Next, a fourth embodiment of the present invention will be described with reference to FIGS. 25 to 27. In the fourth embodiment, a manual handle or a jog switch included in the numerical control device is used to manually operate the robot 60.

Figure 25:
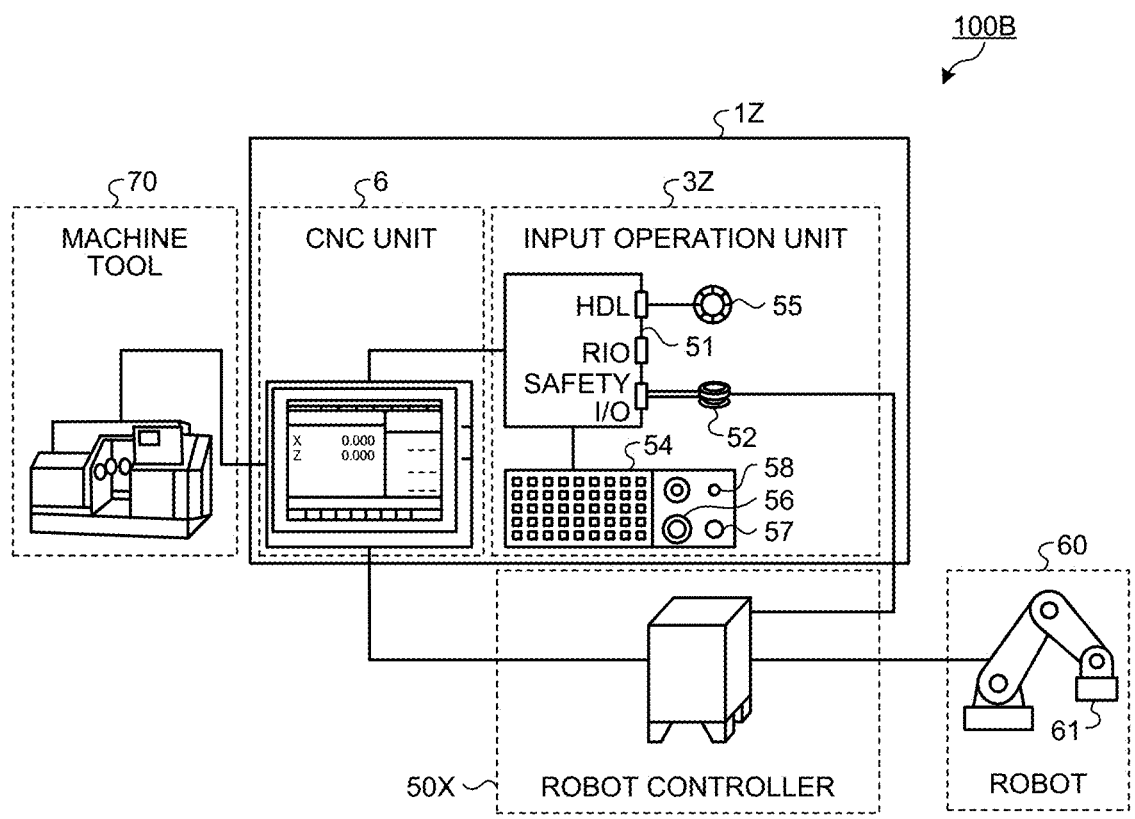
FIG. 25 is a diagram illustrating a configuration of a control system including a numerical control device according to a fourth embodiment.

FIG. 25 is a diagram illustrating a configuration of a control system including the numerical control device according to the fourth embodiment. Among the components in FIG. 25, components that achieve the same functions as those of the control system 100A of the first embodiment illustrated in FIG. 1 are represented by the same reference numerals, and redundant description thereof will not be repeated.

A control system 100B includes the machine tool 70, a numerical control device 1Z, the robot controller 50X, and the robot 60. The numerical control device 1Z includes the CNC unit 6, and an input operation unit 3Z.

The input operation unit 3Z includes the input/output unit 51, the emergency stop button 52, a manual handle 55, and a control panel 54. As illustrated in FIG. 25, only one manual handle 55 is located in the numerical control device 1Z located in the machine tool 70. In this manner, a machine tool is equipped with only one manual handle in many cases. Thus, the control system 100B uses one manual handle 55 while switching it between the use for the machine tool 70 and the use for the robot 60.

The control panel 54 includes a jog switch 57, an override switch 56, and a selecting switch 58 in addition to the functions of the control panel 53 described in the first embodiment.

The manual handle 55 is a handle for manually operating the machine tool 70 and the robot 60. In the present embodiment, the same manual handle 55 is used for manually operating the machine tool 70 with the handle and for manually operating the robot 60 with the handle. Note that the manual handle 55 may be located on the control panel 54.

The override switch 56 is a switch for multiplying the feed speed specified in an NC robot program by a scale factor (override). Alternatively, the override switch 56 may multiply the feed speed specified in an NC program for the machine tool 70 by a scale factor.

The jog switch 57 is a switch for jog operation of the machine tool 70 and the robot 60. Alternatively, the jog switch 57 may be used only for jog operation of the machine tool 70. In this case, jog operation of the robot 60 is performed on a screen displayed on the display unit 4.

The manual handle 55 and the jog switch 57 constitute a manual operation unit. In addition, manual operation on the machine tool 70 corresponds to first manual operation, and manual operation on the robot 60 corresponds to second manual operation.

The selecting switch 58 is a switch for switching the manual handle 55 and the jog switch 57 for the robot 60 or for the machine tool 70. The selecting switch 58 switches the object to be subjected to handle operation. Specifically, the selecting switch 58 switches between inputting data associated with handle operation or the jog switch 57 as operation data indicating operation on the machine tool 70 to a control computation unit 2Z, which will be described later, and inputting the data as operation data indicating handle operation on the robot 60 to the control computation unit 2Z.

Figure 26:
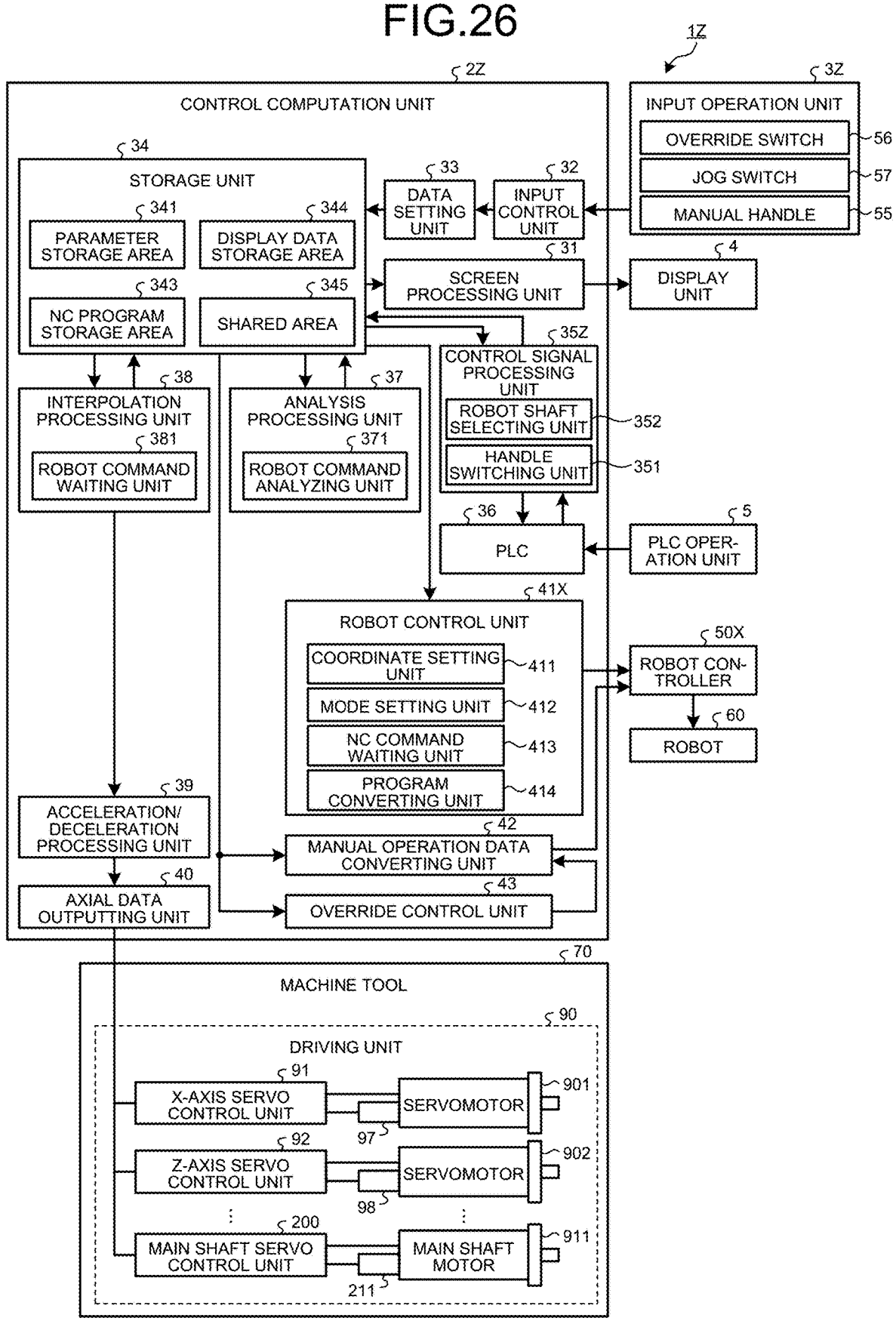
FIG. 26 is a diagram illustrating an example of a configuration of the numerical control device according to the fourth embodiment.
Figure 27:
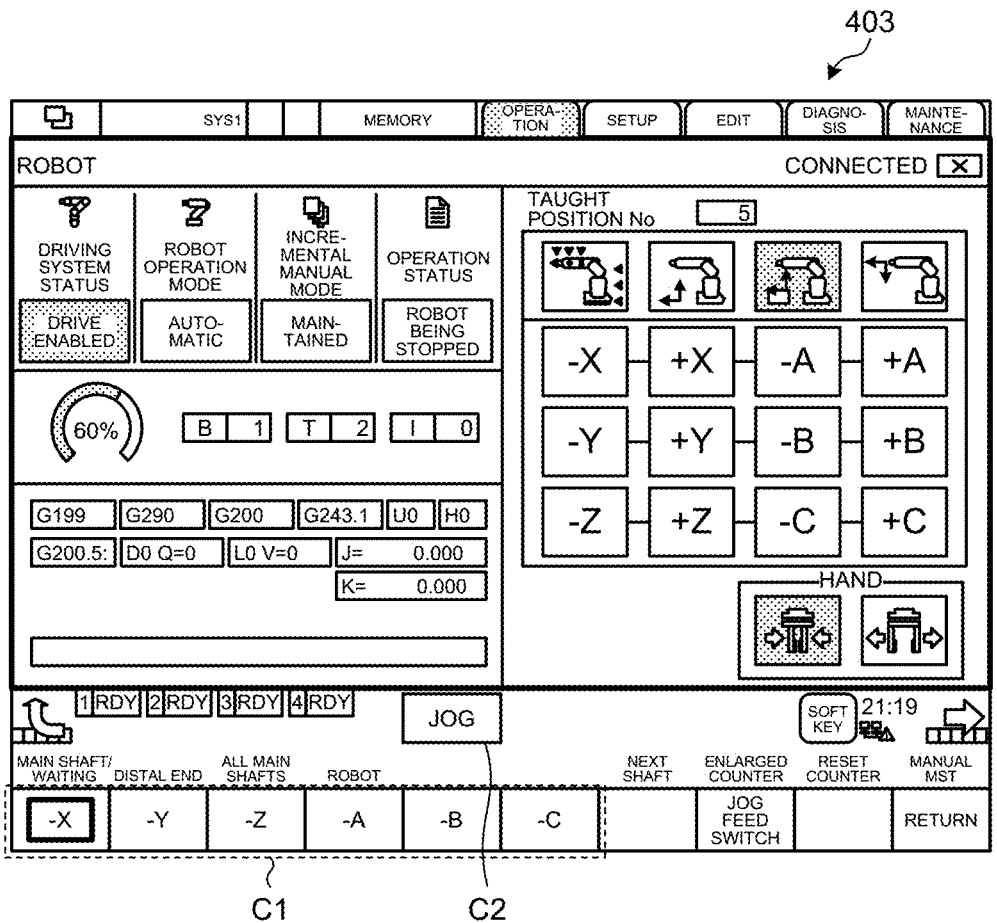
FIG. 27 is a diagram illustrating an example of a jog operation receiving screen displayed by the numerical control device according to the fourth embodiment.

FIG. 26 is a diagram illustrating an example of a configuration of the numerical control device according to the fourth embodiment. Among the components in FIG. 26, components that achieve the same functions as those of the numerical control device 1X of the first embodiment illustrated in FIG. 2 are represented by the same reference numerals, and redundant description thereof will not be repeated. Note that, in FIG. 26, the manual handle 55, the jog switch 57, and the override switch 56 are illustrated as components of the input operation unit 3Z, but the other components are not illustrated.

The numerical control device 1Z includes a control computation unit 2Z instead of the control computation unit 2X. The control computation unit 2Z includes a control signal processing unit 35Z instead of the control signal processing unit 35X. The control signal processing unit 35Z includes a handle switching unit 351, and a robot shaft selecting unit 352.

The handle switching unit 351 checks the state of selecting switch 58 for switching the object to be subjected to handle operation on the control panel 54 to determine whether the manual handle 55 is in a state of controlling the machine tool 70 or in a state of controlling the robot 60. The handle switching unit 351 switches the handle operation with the manual handle 55 between handle operation on the robot 60 and handle operation on the machine tool 70 on the basis of the state of the selecting switch 58.

When the handle operation is handle operation on the robot 60, the handle switching unit 351 stores data associated with the handle operation as data for operating the robot 60 in the shared area 345. The data for operating the robot 60 are data of a handle pulse generator output for handle operation by the manual handle 55, and associated with the movement amount by which a specific position of the robot 60 is to be moved.

When the handle operation is handle operation on the machine tool 70, the handle switching unit 351 stores data associated with the handle operation as data for operating the machine tool 70 in the shared area 345. The data for operating the machine tool 70 are data of a handle pulse generator output for handle operation by the manual handle 55, and are associated with the movement amount by which a specific position of the machine tool 70 is to be moved.

A button for specifying an NC shaft is provided for each NC shaft on the PLC operation unit 5 or the control panel 54. In the state of controlling the robot 60, the buttons for specifying an NC shaft are used as buttons for specifying a robot shaft.

In the state of controlling the robot 60, the robot shaft selecting unit 352 selects a robot shaft associated with a button specified by the user on the basis of information indicating the association between buttons specifying an NC shaft and the buttons for specifying a robot shaft. The information indicating the association between NC shafts and robot shafts is stored in the storage unit 34, for example. The robot shaft selecting unit 352 stores the selected robot shaft in the shared area 345.

In addition, the control computation unit 2Z includes a manual operation data converting unit 42, and an override control unit 43. When the manual handle 55 is in the state of operating the robot 60, the manual operation data converting unit 42 reads data associated with a handle operation performed by the user. The data associated with a handle operation are data of a handle pulse generator and are associated with the movement amount by which the robot 60 is to be moved. When the data associated with a handle operation are data for operating the robot 60, the manual operation data converting unit 42 reads the data of the handle pulse generator from the shared area 345.

The manual operation data converting unit 42 sends, to the robot controller 50X, the read data as data of the robot shaft (data in the robot coordinate system) selected by the operation on the control panel 54. Specifically, the manual operation data converting unit 42 creates a robot program specifying the robot shaft selected by the robot shaft selecting unit 352 and the movement amount saved in the shared area 345, and sends the robot program to the robot controller 50X. When a plurality of robot shafts are selected, the manual operation data converting unit 42 distributes data for operating the robot 60 to the individual robot shafts.

The override control unit 43 detects the state of the override switch 56, and sends the proportion of speed data associated with the detected state to the manual operation data converting unit 42.

When the manual handle 55 is in the state of controlling the machine tool 70, the numerical control device 1Z operates the machine tool 70 in response to a handle operation performed by the user.

In addition, in the case where the jog switch 57 is used, the jog operation may be switched between the operation for the machine tool 70 and the operation for the robot 60 in a manner similar to the manual handle 55. When the robot 60 is operated with the jog switch 57, the manual operation data converting unit 42 reads data associated with the jog operation from the shared area 345, converts the read data into data for the robot shaft selected by the user, and sends the data to the robot controller 50X. The data for operating the robot 60 are data output by the jog switch 57 in response to a jog operation, and are associated with the movement amount by which a specific position of the robot 60 is to be moved.

When the machine tool 70 is operated with the jog switch 57, the interpolation processing unit 38 read data associated with the jog operation from the shared area 345, converts the read data into data for the drive shaft or the main shaft selected by the user, and sends the data to the machine tool 70.

Alternatively, the numerical control device 1Z may display a jog operation receiving screen, which is a screen for receiving jog operations for the robot 60, on the display unit 4. FIG. 27 is a diagram illustrating an example of the jog operation receiving screen displayed by the numerical control device according to the fourth embodiment.

The jog operation receiving screen 403 includes a region C1 for displaying the names of robot shaft that can be selected as the object to be operated in the robot 60. The user touches the name of an intended robot shaft on the jog operation receiving screen 403, and the robot shaft is thus selected. The example illustrated in FIG. 27 is a case where the X axis is selected as a robot shaft.

In addition, the jog operation receiving screen 403 displays a jog button C2 for performing jog operation. When the jog button C2 is pressed or touched by the user, the numerical control device 1Z receives a jog operation (manual operation) for the X axis of the robot shaft. In this process, when the operation of the robot 60 is too fast and the robot 60 is in a state of being manually controlled, the speed of the robot 60 can be lowered by the override switch 56.

When the override switch 56 is operated by the user, the override control unit 43 detects the state of the override switch 56, and sends the proportion (%) associated with the detected state and the speed data to the manual operation data converting unit 42. When data of 10%, for example, are received, the manual operation data converting unit 42 sets the speed of the robot 60 to be 10% of the speed indicated by speed data, and sends the speed data to the robot controller 50X.

As described above, according to the fourth embodiment, the user of the numerical control device 1Z need not perform manual operation of the robot 60 on the robot controller 50X, and the numerical control device 1Z can perform manual operation of the robot 60, which improves the work efficiency such as teaching work performed by the user to teach the position of the robot hand 61.

A hardware configuration of the control computation unit 2X in the numerical control device 1X, the control computation unit 2Xa in the numerical control device 1Xa, the control computation unit 2Y in the numerical control device 1Y, and the control computation unit 2Z in the numerical control device 1Z will be described. Note that, because the control computation units 2X, 2Xa, 2Y, and 2Z have hardware configurations similar to each other, the hardware configuration of the control computation unit 2X will be described herein.

Figure 28:
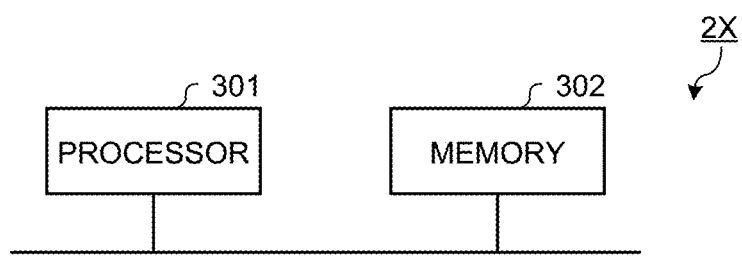
FIG. 28 is a diagram illustrating an example of a hardware configuration of a control computation unit according to the first embodiment.

FIG. 28 is a diagram illustrating an example of a hardware configuration of the control computation unit according to the first embodiment. The control computation unit 2X can be implemented by a processor 301 and a memory 302 illustrated in FIG. 28. Examples of the processor 301 include a central processing unit (CPU; also referred to as a central processing device, a processing device, a computing device, a microprocessor, a microcomputer, a processor, or a digital signal processor (DSP)) or a system large scale integration (LSI). Examples of the memory 302 include a random access memory (RAM) and a read only memory (ROM).

The control computation unit 2X is implemented by the processor 301 by reading and executing programs for performing operations of the control computation unit 2X stored in the memory 302. In other words, the programs cause a computer to execute the procedures or methods of the control computation unit 2X. The memory 302 is also used as a temporary memory when the processor 301 executes various processes.

The programs to be executed by the processor 301 may be a computer program product including a computer-readable and non-transitory recording medium containing a plurality of computer-executable instructions for performing data processing. The programs to be executed by the processor 301 include a plurality of instructions that cause a computer to perform data processing.

Alternatively, the control computation unit 2X may be implemented by dedicated hardware. Alternatively, some of the functions of the control computation unit 2X may be implemented by dedicated hardware, and the others may be implemented by software or firmware.

Note that the descriptions in the first to fourth embodiments may be combined. For example, the numerical control device 1Xa or 1Y may be located in the control system 100A or may be located in the control system 100B. In addition, the numerical control device 1Z may be located in the control system 100A. Furthermore, in the control computation unit 2Y or 2Z, the screen processing unit 31a and the input control unit 32a may be disposed instead of the screen processing unit 31 and the input control unit 32. Furthermore, in the numerical control device 1Xa or 1Z, the robot control unit 41Y and the robot controller 50Y may be disposed instead of the robot control unit 41X and the robot controller 50X.

The configurations presented in the embodiments above are examples of the present invention, and can be combined with other known technologies or can be partly omitted or modified without departing from the scope of the present invention.

REFERENCE SIGNS LIST 1X, 1Xa, 1Y, 1Z numerical control device; 2X, 2Xa, 2Y, 2Z control computation unit; 3X, 3Z input operation unit; 4 display unit; 6 CNC unit; 31, 31*a* screen processing unit; 32, 32*a* input control unit; 34 storage unit; 35X, 35Z control signal processing unit; 37 analysis processing unit; 38 interpolation processing unit; 41X, 41Y robot control unit; 42 manual operation data converting unit; 43 override control unit; 50X, 50Y robot controller; 51 input/output unit; 52 emergency stop button; 53, 54 control panel; 55 manual handle; 56 override switch; 57 jog switch; 58 selecting switch; 60 robot; 61 robot hand; 70 machine tool; 71 tool; 75 raw piece placement area; 76 temporary placement area; 77 finished piece placement area; 82 workpiece; 84 deburring tool; 90 driving unit; 100A, 100B control system; 101 robot command list information; 102 association information; 103 joint interpolation information; 104 address information; 105 linear interpolation information; 106 circular interpolation information; 201, 203, 501 NC program; 202 robot program; 204 access data; 301 processor; 302 memory; 311 NC robot data display unit; 321 NC robot program editing unit; 343 NC program storage area; 345 shared area; 351 handle switching unit; 352 robot shaft selecting unit; 371 robot command analyzing unit; 381 robot command waiting unit; 401 editing screen; 402 robot state display screen; 403 jog operation receiving screen; 411 coordinate setting unit; 412 mode setting unit; 413 NC command waiting unit; 414 program converting unit; 415 robot IF accessing unit; 510 robot IF; HP auxiliary point; P1 start position; P2 middle position; P3 target position; PA, PC, PE start point; PB, PD, PF end point; Q1 reference direction; T1, T2 path.

The invention claimed is:

1. A numerical control device comprising:
control computation circuitry configured to control a machine tool and a robot by using a numerical control program defined in a first coordinate system, wherein the control computation circuitry includes:
a memory configured to store the numerical control program, the numerical control program including a first command and a second command, the first command being a command for the machine tool described in a first programming language, and the second command being a command for the robot described in the first programming language; and
conversion circuitry configured to convert the second command into a third command, the conversion of the second command into the third command occurring during execution of the numerical control program to control the machine tool and the robot, and the third command being a robot program used for controlling the robot,
the control computation circuitry is configured to control the machine tool by using the first command and control the robot by using the third command, and
both the second command for the robot and the first command for the machine tool are included in the same numerical control program.

2. The numerical control device according to claim 1, wherein
the first command and the second command in the numerical control program are defined in the first coordinate system,
the third command is defined in a second coordinate system and is described in a second programming language, and
the conversion circuitry is configured to convert the second command into the third command during the execution of the numerical control program to control the machine tool and the robot on the basis of an association between the first coordinate system and the second coordinate system.

3. The numerical control device according to claim 1, wherein
the numerical control program includes an instruction to synchronize the machine tool and the robot,
the control computation circuitry further includes:
first waiting circuitry configured to keep operation of the machine tool on standby until an operation of the robot associated with a first standby command is completed when the first standby command to wait for the operation of the robot is present in the first command during execution of the first command, and
second waiting circuitry configured to keep operation of the robot on standby until operation an of the machine tool associated with a second standby command is completed when the second standby command to wait for the operation of the machine tool is present in the second command during execution of the second command.

4. The numerical control device according to claim 1, further comprising:
a display to display an editing screen for editing of the numerical control program and a state display screen displaying a state of the robot.

5. The numerical control device according to claim 1, wherein
upon receiving an instruction for an override of an operation of the robot, the control computation circuitry is configured to multiply the operation of the robot by an override factor.

6. The numerical control device according to claim 1, wherein
the control computation circuitry is configured to send the third command to a robot controller during the execution of the numerical control program to control the machine tool and the robot, and
the robot controller controls the robot.

7. The numerical control device according to claim 1, wherein the second command for the robot immediately follows the first command for the machine tool in the numerical control program.

8. The numerical control device according to claim 1, wherein the second command for the robot immediately precedes the first command for the machine tool in the numerical control program.

9. The numerical control device according to claim 1, wherein
the first command for the machine tool constitutes a first system,
the second command for the robot constitutes a second system, and
the first system and the second system are included in the same numerical control program.

10. A numerical control device comprising:
control computation circuitry configured to control a machine tool and a robot by using a numerical control program defined in a first coordinate system, wherein the control computation circuitry includes:
a memory configured to store the numerical control program, the numerical control program including a first command and a second command, the first command being a command for the machine tool described in a first programming language, and the second command being a command for the robot described in the first programming language; and accessing circuitry configured to access a robot interface upon receiving the second command, the accessing the robot interface occurring during execution of the numerical control program to control the machine tool and the robot, the robot interface sending a command to the robot, the control computation circuitry is configured to control the machine tool on the basis of the first command and control the robot by accessing the robot interface by the accessing circuitry, and both the second command for the robot and the first command for the machine tool are included in the same numerical control program.

11. The numerical control device according to claim 10, wherein upon being accessed with a function and command coordinates defined in a second coordinate system, the robot interface performs a process associated with the function and the command coordinates on the robot, and the accessing circuitry is configured to access the robot interface during the execution of the numerical control program to control the machine tool and the robot with a function and command coordinates associated with the second command on the basis of an association between the first coordinate system and the second coordinate system.

12. The numerical control device according to claim 10, wherein the numerical control program includes an instruction to synchronize the machine tool and the robot, the control computation circuitry further includes:

first waiting circuitry configured to keep operation of the machine tool on standby until an operation of the robot associated with a first standby command is completed when the first standby command to wait for the operation of the robot is present in the first command during execution of the first command, and second waiting circuitry configured to keep operation of the robot on standby until operation an of the machine tool associated with a second standby command is completed when the second standby command to wait for the operation of the machine tool is present in the second command during execution of the second command.

13. The numerical control device according to claim 10, further comprising:

a display to display an editing screen for editing of the numerical control program and a state display screen displaying a state of the robot.

14. The numerical control device according to claim 10, wherein upon receiving an instruction for an override of an operation of the robot, the control computation circuitry is configured to multiply the operation of the robot by an override factor.

15. A numerical control method comprising:

controlling a machine tool and a robot by using a numerical control program defined in a first coordinate system, wherein the controlling includes:

storing the numerical control program, the numerical control program including a first command and a second command, the first command being a command for the machine tool described in a first programming language, and the second command being a command for the robot described in the first programming language;

converting the second command into a third command, the conversion of the second command into the third command occurring during execution of the numerical control program to control the machine tool and the robot, the third command being a robot program used for controlling the robot;

controlling the machine tool by using the first command; and controlling the robot by using the third command, and both the second command for the robot and the first command for the machine tool are included in the same numerical control program.

16. The numerical control method according to claim 15, wherein the controlling includes sending the third command to a robot controller during the execution of the numerical control program to control the machine tool and the robot, and the robot controller controls the robot.

* * * * *